US012616965B2

(12) United States Patent
Parsapur et al.

(10) Patent No.: US 12,616,965 B2
(45) Date of Patent: May 5, 2026

(54) HIERARCHICALLY ORDERED CRYSTALLINE MICROPOROUS MATERIALS WITH LONG-RANGE MESOPOROUS ORDER HAVING CUBIC SYMMETRY

(71) Applicants: Saudi Arabian Oil Company, Dhahran (SA); King Abdullah University of Science and Technology, Thuwal (SA)

(72) Inventors: Rajesh Kumar Parsapur, Thuwal (SA); Robert Peter Hodgkins, Dhahran (SA); Omer Refa Koseoglu, Istanbul (TR); Kuo-Wei Huang, Thuwal (SA); Anissa Bendjeriou Sedjerari, Thuwal (SA)

(73) Assignees: Saudi Arabian Oil Company, Dhahran (SA); King Abdullah University of Science and Technology, Thuwal (SA)

( * ) Notice: Subject to any disclaimer, the term of this patent is extended or adjusted under 35 U.S.C. 154(b) by 0 days.

(21) Appl. No.: 19/296,083

(22) Filed: Aug. 11, 2025

(65) Prior Publication Data

US 2026/0001064 A1     Jan. 1, 2026

Related U.S. Application Data

(63) Continuation of application No. 18/151,892, filed on Jan. 9, 2023, now Pat. No. 12,409,445, which is a
(Continued)

(51) Int. Cl.
    *B01J 29/08*        (2006.01)
    *B01J 21/04*        (2006.01)
    (Continued)

(52) U.S. Cl.
    CPC ............. *B01J 29/084* (2013.01); *B01J 21/04* (2013.01); *B01J 23/881* (2013.01);
    (Continued)

(58) Field of Classification Search
    CPC ..... C10G 49/08; C01B 39/20; C01P 2002/74; C01P 2002/76
    See application file for complete search history.

(56) References Cited

U.S. PATENT DOCUMENTS 10,118,163 B1    11/2018  Zhang
11,820,948 B1    11/2023  Akah et al.
                 (Continued)

FOREIGN PATENT DOCUMENTS

CN       105692644 A       6/2016
WO     2004033587 A2      4/2004
                (Continued)

OTHER PUBLICATIONS

E. Sujandi, E.A. Prasetyanto, S.-C. Lee, S.-E. Park, Microporous Mesoporous Mater., 118 (2009), pp. 134-142. <https://doi.org/10.1016/j.micromeso.2008.08.035> (Year: 2009).*
(Continued)

*Primary Examiner* — Brian A McCaig
(74) *Attorney, Agent, or Firm* — Leason Ellis LLP

(57) ABSTRACT

A composition of matter is provided comprising hierarchically ordered crystalline microporous material having well-defined long-range mesoporous ordering of cubic symmetry. The composition possesses mesopores having walls of crystalline microporous material and a mass of mesostructure between mesopores of crystalline microporous material. Long-range ordering is defined by presence of secondary peaks in an X-ray diffraction (XRD) pattern and/or cubic symmetry observable by microscopy.

20 Claims, 8 Drawing Sheets

Related U.S. Application Data continuation-in-part of application No. 17/857,447, filed on Jul. 5, 2022, now Pat. No. 12,152,204.

(51) Int. Cl.

| | | |
|---|---|---|
| *B01J 23/881* | (2006.01) | |
| *C01B 39/02* | (2006.01) | |
| *C01B 39/24* | (2006.01) | |
| *C10G 47/20* | (2006.01) | |

(52) U.S. Cl.

CPC ............ *C01B 39/026* (2013.01); *C01B 39/24* (2013.01); *C10G 47/20* (2013.01); *C01P 2002/72* (2013.01); *C01P 2002/76* (2013.01); *C01P 2002/77* (2013.01); *C01P 2002/88* (2013.01); *C01P 2004/04* (2013.01); *C10G 2300/1074* (2013.01)

(56) References Cited

U.S. PATENT DOCUMENTS

| | | |
|---|---|---|
| 12,338,130 B2 | 6/2025 | Parsapur et al. |
| 2005/0239634 A1 | 10/2005 | Ying et al. |
| 2006/0096891 A1 | 5/2006 | Stamires et al. |
| 2007/0227351 A1 | 10/2007 | Garcia-Martinez |
| 2009/0090657 A1 | 4/2009 | Ying et al. |
| 2011/0171121 A1 | 7/2011 | Senderov et al. |
| 2012/0275993 A1 | 11/2012 | Olson |
| 2013/0292300 A1 | 11/2013 | Ying et al. |
| 2014/0286846 A1 | 9/2014 | Suib et al. |
| 2016/0137516 A1 | 5/2016 | Kegnaes et al. |
| 2016/0167973 A1 | 6/2016 | Boorse et al. |
| 2017/0157598 A1 | 6/2017 | Chal et al. |
| 2017/0267537 A1 | 9/2017 | Machoke et al. |
| 2018/0194636 A1 | 7/2018 | Cheng et al. |
| 2018/0311652 A1 | 11/2018 | Zheng et al. |
| 2018/0345217 A1 | 12/2018 | Goffe |
| 2018/0345218 A1 | 12/2018 | Goffe |
| 2019/0039054 A1 | 2/2019 | Pilyugina |
| 2019/0231897 A1 | 8/2019 | Balasamy et al. |
| 2019/0232261 A1 | 8/2019 | Yanson et al. |
| 2020/0139355 A1 | 5/2020 | Cheon et al. |
| 2020/0165140 A1 | 5/2020 | Verboekend et al. |
| 2020/0223708 A1 | 7/2020 | Bauer et al. |
| 2020/0398252 A1 | 12/2020 | Ma et al. |
| 2021/0001317 A1 | 1/2021 | Sun et al. |
| 2021/0047193 A1 | 2/2021 | Choi et al. |
| 2021/0179437 A1 | 6/2021 | Cheon et al. |
| 2021/0347647 A1 | 11/2021 | Lim et al. |
| 2022/0032275 A1 | 2/2022 | Zhang |
| 2024/0009657 A1 | 1/2024 | Parsapur |
| 2024/0009660 A1 | 1/2024 | Parsapur |
| 2024/0010662 A1 | 1/2024 | Parsapur |

FOREIGN PATENT DOCUMENTS

| | | |
|---|---|---|
| WO | 2006031259 A2 | 3/2006 |
| WO | 2012138910 A2 | 10/2012 |
| WO | 2014063667 A1 | 5/2014 |
| WO | 2019010700 A1 | 1/2019 |
| WO | 2020036985 A1 | 2/2020 |
| WO | 2021126298 A1 | 6/2021 |
| WO | 2022235221 A1 | 11/2022 |

OTHER PUBLICATIONS

Parsapur, R.K., Selvam, P. Rational design, synthesis, characterization and catalytic properties of high-quality low-silica hierarchical FAU- and LTA-type zeolites. Sci Rep 8, 16291 (2018). <https://doi.org/10.1038/s41598-018-34479-4> (Year: 2018).*

International Search Report and Written Opinion mailed Nov. 27, 2023, for Application No. PCT/US2023/069235. 11 pages.

International Search Report and Written Opinion mailed Oct. 24, 2023, for Application No. PCT/US2023/069238. 12 pages.

International Search Report and Written Opinion mailed Oct. 26, 2023, for Application No. PCT/US2023/069243. 11 pages.

International Search Report and Written Opinion mailed Nov. 2, 2023, for Application No. PCT/US2023/069247. 13 pages.

U.S. Final Office Action mailed Jun. 17, 2024, for U.S. Appl. No. 17/857,572. 21 pages.

U.S. Final Office Action mailed Feb. 13, 2025, for U.S. Appl. No. 17/857,671. 40 pages.

U.S. Non-Final Office Action mailed Dec. 27, 2023, for U.S. Appl. No. 17/857,572. 15 pages.

U.S. Non-Final Office Action mailed Mar. 20, 2024, for U.S. Appl. No. 17/857,447. 9 pages.

U.S. Non-Final Office Action mailed Jan. 24, 2025, for U.S. Appl. No. 18/151,892. 8 pages.

U.S. Non-Final Office Action mailed Aug. 28, 2024, for U.S. Appl. No. 17/857,503. 10 pages.

U.S. Non-Final Office Action mailed Jun. 24, 2025, for U.S. Appl. No. 18/151,984. 17 pages.

U.S. Non-Final Office Action mailed Jun. 27, 2024, for U.S. Appl. No. 17/857,671. 31 pages.

U.S. Non-Final Office Action mailed Jun. 18, 2025, for U.S. Appl. No. 17/857,671. 56 pages.

Response to U.S. Non-Final Office Action filed Dec. 12, 2024, for U.S. Appl. No. 17/857,503. 10 pages.

Response to U.S. Non-Final Office Action filed Jun. 24, 2024, for U.S. Appl. No. 17/857,447. 7 pages.

Response to U.S. Non-Final Office Action filed Mar. 25, 2024, for U.S. Appl. No. 17/857,572. 37 pages.

Response to U.S. Non-Final Office Action filed Mar. 4, 2025, for U.S. Appl. No. 18/151,892. 8 pages.

Response to U.S. Non-Final Office Action filed Sep. 17, 2025, for U.S. Appl. No. 17/857,671. 18 pages.

Response to U.S Non-Final Office Action filed Dec. 13, 2024, for U.S. Appl. No. 17/857,671. 11 pages.

Response to U.S. Final Office Action filed Oct. 30, 2024, for U.S. Appl. No. 17/857,572. 21 pages.

Response to U.S. Final Office Action filed May 13, 2025, for U.S. Appl. No. 17/857,671. 18 pages.

Bao et al. "Potential of microporous metal-organic frameworks for separation of hydrocarbon mixtures." Energy Environ Sci. 2016; 9: 3612-41. 30 pages.

Beck et al. "A new family of mesoporous molecular sieves prepared with liquid crystal templates." J Am Chem Soc. 1992; 114(27): 10834-43. 10 pages.

Beck et al. "Molecular or supramolecular templating: defining the role of surfactant chemistry in the formation of microporous and mesoporous molecular sieves." Chem Mater. 1994; 6: 1816-21. 6 pages.

Bradshaw et al. "Supramolecular templating of hierarchically porous metal-organic frameworks." Chem Soc Rev. 2014; 43: 5431-43. 13 pages.

Cho et al. "Synthesis of porous silica with hierarchical structure directed by a silica precursor carry a pore-generating cage." J Mater Chem. 2008; 18: 4971-6. 6 pages.

Choi et al. "Amphiphilic organosilane-directed synthesis of crystalline zeolite with tunable mesoporosity." Nat Mater. 2006; 5(9): 718-23. 6 pages.

Derbe et al. "A short freview on synthesis, characterization, and applications of zeolites." Adv Mater Sci Eng. 2021; 6637898. 17 pages.

Egeblad et al. "Templating mesoporous zeolites." Chem Mater. 2008; 20: 946-60. 15 pages.

Frising et al. "Extraframework cation distributions in X and Y faujasite zeolites: A review." Micropor Mesopor Mater. 2008: 114: 27-63. 37 pages.

Garcia-Martinez et al. "Mesostructured zeolite Y—high hydrothermal stability and superior FCC catalytic performance." Catal Sci Tech. 2012; 2(5): 987-94. 8 pages.

(56) References Cited

OTHER PUBLICATIONS

Garcia-Martinez et al. "Evidence of intracrystalline mesostructured porosity in zeolites by advanced gas sorption, electron tomography and rotation electron diffraction." ChemCatChem 6.11 (2014): 3110-3115. 6 pages.

Hartmann. "Hierarchical zeolites: a proven strategy to combine shape selectivity with efficient mass transport." Angew Chem Ed. 2004; 43: 5880-2. 3 pages.

Inayat et al. "Assemblies of mesoporous FAU-type zeolite nanosheets." Ange Chem Int Ed. 2012; 51(8): 1962-5. 4 pages.

Indira et al. "A review on recent developments in Zeolite A synthesis for improved carbon dioxide capture: Implications for the water-energy nexus." Energy Nexus. Sep. 7, 2022: 100095. 12 pages.

Jia et al. "Modern synthesis strategies for hierarchical zeolites: Bottom-up versus top-down strategies." Adv Powder Tech. 2019; 30(3): 467-84.17 pages.

Kang et al. "Hofmeister series: Insights of ion specificity from amphiphilic assembly and interface property." ACS Omega. 2020; 5(12): 6229-39. 11 pages.

Kerstens et al. "State of the art and perspectives of hierarchical zeolites: practical overview of synthesis methods and use in catalysis." Advanced Materials 32.44 (2020): Wiley Online Library. 2004690.

Kresge et al. "Ordered mesoporous molecular sieves synthesized by a liquid-crystal template mechanism." Nature. 1992; 359 (6397): 710-2. 3 pages.

Kresge et al. "The discovery of mesoporous molecular sieves from the twenty year perspective." Chem Soc Rev. May 7, 2013;42(9):3663-70. 8 pages.

Li et al. "Building Zeolites from Precrystallized Units: Nanoscale Architecture." Angew Chem Int Ed Engl. 2018;57 (47):15330-15353. 24 pages.

Liu et al. Y/MCM-41 composites assembled from nanocrystals. Micropor Mesopor Mater. 2013; 181: 116-22. 7 pages.

Liu et al. "Surface-supported metal-organic framework thin films: fabrication methods, applications, and challenges." Chem Soc Rev. 2017; 45: 5730-70. 41 pages.

Luan et al. "Templates for the synthesis of zeolites." Chinese J Struct Chem. 2024; 43: 100252. 11 pages.

Mei et al. "Hierarchically porous Beta/SBA-16 with different silica-alumina ratios and the hydrodesulfurization performances of DBT and 4, 6-DMDBT." Petrol Science. 2022; 19(1): 375-86. 12 pages.

Mendoza-Castro et al. "Surfactant-Templated Zeolites: From Thermodynamics to Direct Observation." Adv Mater Inter. 2021; 8(4): 2001388.

Mirzoeva et al. "Discovery of a 3-amino-6-phenyl-pyridazine derivative as a new synthetic antineuroinflammatory compound." J Med Chem. 2002;45(3):563-566. 4 pages.

Moller et al. "Pores within pores—how to craft ordered hierarchical zeolites." Science 333.6040 (2011): 297-298. 2 pages.

Na et al. "Directing zeolite structures into hierarchically nanoporous architectures." Science. 2011; 333: 328-332. 5 pages.

No Author Listed, "Derivative." Oxford Dict Chem. 2008. 6th Ed. Daintith, Ed. 169:231. 1 page.

Ondrus et al. "Total synthesis and study of myrmicarin alkaloids." Chem Commun (Camb). 2009;(28):4151-4165. 15 pages.

Panda et al. "Introducing mesoporosity in zeolite 4A bodies for rapid CO2 capture." J CO2 Util. 2020; 40: 101223. 11 pages.

Parsapur et al. "Post-Synthetic Ensembling Design of Hierarchically Ordered FAU-type Zeolite Frameworks for Vacuum Gas Oil Hydrocracking." Angew Chem Int Ed Engl. 2024;63(6):e202314217. 11 pages.

Qu et al. "Hierarchical zeolites: synthesis, structural control, and catalytic application." Emergent Mater. 2020; 3: 381-405. 21 pages.

Raman et al. "Template-based approaches to the preparation of amorphous, nanoporous silicas." Chem Mater. 1996; 8: 1682-1701. 10 pages.

Roth et al. "Two-dimensional zeolites: current status and perspectives." Chemical Reviews 114.9 (2014): 4807-4837. 31 pages.

Sachshe et al. "Surfactant-templating of zeolites: from design to application." Chem Mater. 2017; 29(9): 3827-53. 27 pages.

Schwieger et al. "Hierarchy concepts: classification and preparation strategies for zeolite containing materials with hierarchical porosity." Chem Soc Rev. 2016; 45(12): 3353-76. 14 pages.

Smith et al. "Modular synthesis of biologically active phosphatidic acid probes using click chemistry." Mol Biosyst. 2009;5(9):962-972. 11 pages.

Tempelman et al. "Texture, acidity and fluid catalytic cracking performance of hierarchical faujasite zeolite prepared by an amphiphilic organosilane." Fuel Process Technol. 2015; 139: 248-58. 11 pages.

Thiele. "Surfactants." Chapter 30. Chromatographic analysis of the environment. 1173-98. 26 pages.

Verboekend et al. "Hierarchical zeolites by desilication: Occurrence and catalytic impact of recrystallization and restructuring." Crys Growth Des. 2013; 13(11): 5025-35. 11 pages.

Wang et al. "Hierarchical ZSM-5 zeolite with radial mesopores: preparation, formation mechanism and application for benzene alkylation." Frontiers of Chemical Science and Engineering 14 (2020): 248-257. 10 pages.

Wong et al.; Surfactant-templated Mesostructured Materials: Synthesis and Compositional Control; Nanoporous Materials—Science and Engineering, Imperial College Press, London; Jan. 1, 2004; pp. 125-164. 39 pages.

Zana (Ed.). "Chapter 1: Introduction to Surfactants and Surfactant Self-Assemblies." Dynamics of surfactant self- assemblies: micelles, microemulsions, vesicles and lyotropic phases. CRC Press, Taylor & Francis Group. Boca Raton, Florida. 2005.

Zhang et al. "Synthesis, characterization, and catalytic performance of NiMo catalysts supported on hierarchically porous Beta-KIT-6 material in the hydrodesulfurization of dibenzothiophene." Journal of Catalysis 274.2 (2010): 273-286. 14 pages.

Zhang et al. "Synthesis of hierarchically porous silica and metal oxide beads using emulsion-templated polymer scaffolds." Chem Mater. 2004; 16: 4245-56. 12 pages.

Zhao et al. "Nonionic triblock and star diblock copolymer and oligomeric surfactant syntheses of highly ordered, hydrothermally stable, mesoporous silica structures." J Am Chem Soc. 1998; 120(24): 6024-36. 13 pages.

Zhu et al. "Synthesis of hierarchical zeolites using an inexpensive mono-quaternary ammonium surfactant as mesoporogen." Chem Comm. 2014; 50(93): 14658-14661. 4 pages.

* cited by examiner

Controlled
Dissolution

Supramolecular
Self-Assembly

FIG. 5A                    FIG. 5B

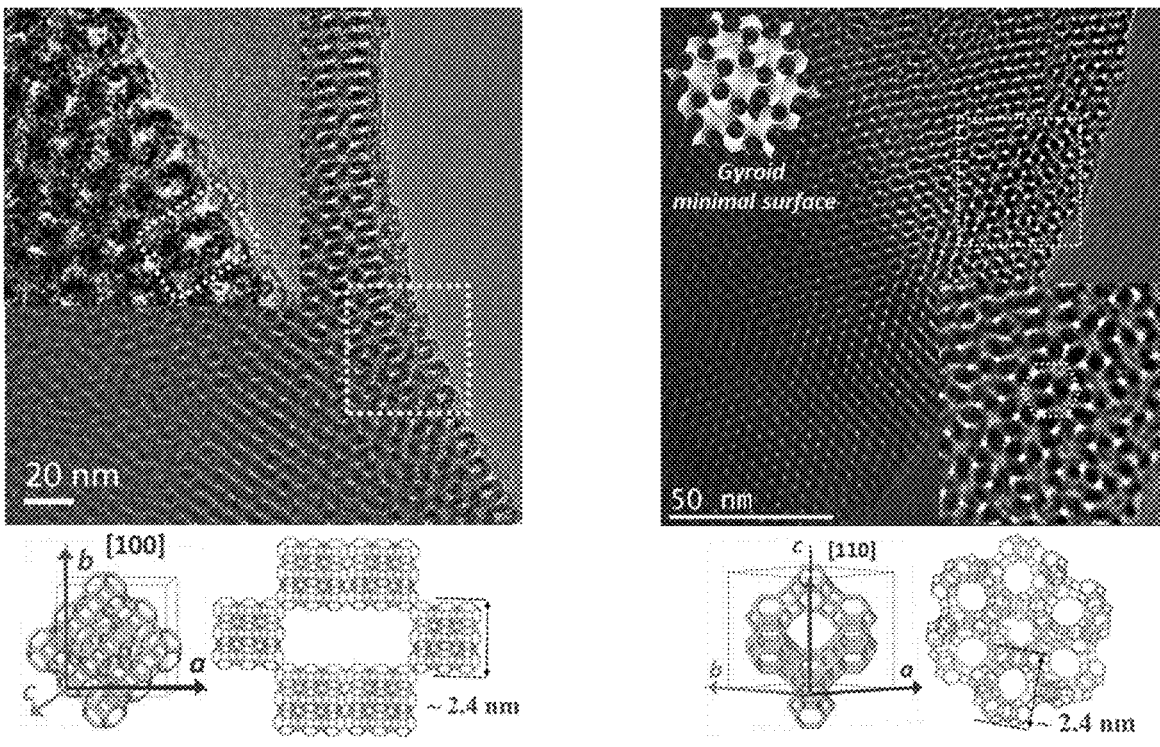
FIG. 8A
FIG. 8B
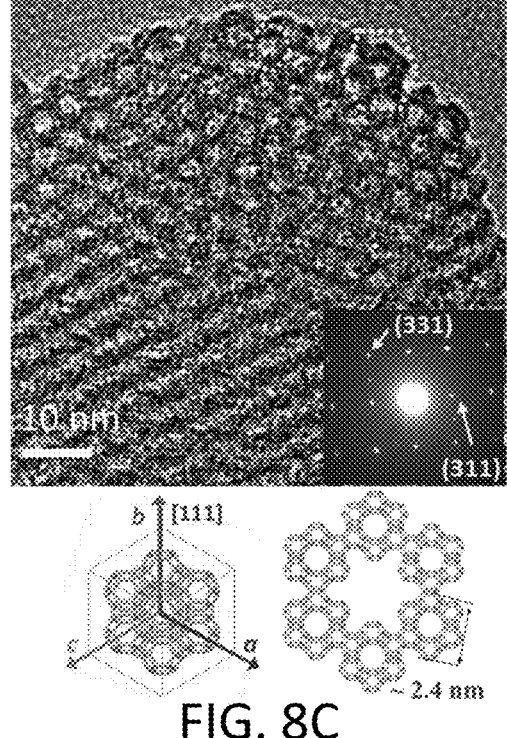
FIG. 8C

HIERARCHICALLY ORDERED CRYSTALLINE MICROPOROUS MATERIALS WITH LONG-RANGE MESOPOROUS ORDER HAVING CUBIC SYMMETRY

RELATED APPLICATIONS

This application is a continuation of U.S. patent application Ser. No. 18/151,892 filed Jan. 9, 2023, which is a continuation-in-part of U.S. patent application Ser. No. 17/857,447 filed Jul. 5, 2022, now U.S. Pat. No. 12,152,204, the contents of which are incorporated herein by reference.

FIELD OF THE DISCLOSURE

The present disclosure relates to hierarchically ordered crystalline microporous materials.

BACKGROUND OF THE DISCLOSURE

Zeolites are microporous aluminosilicate materials possessing well-defined structures and uniform pore sizes that can be measured in nanometers or angstroms ($\cup$) (pores typically up to about 20 Å). Typically, zeolites comprise framework atoms such as silicon, aluminum and oxygen arranged as silica and alumina tetrahedra. Zeolites are generally hydrated aluminum silicates that can be made or selected with a controlled porosity and other characteristics, and typically contain cations, water and/or other molecules located in the porous network. Hundreds of natural and synthetic zeolite framework types exist with a wide range of applications. Numerous zeolites occur naturally and are extensively mined, whereas a wealth of interdependent research has resulted in an abundance of synthetic zeolites of different structures and compositions. The unique properties of zeolites and the ability to tailor zeolites for specific applications has resulted in the extensive use of zeolites in industry as catalysts (e.g., catalytic cracking of hydrocarbons or as components in catalytic convertors), molecular sieves, adsorbents (e.g., drying agents), ion exchange materials (e.g., water softening) and for the separation of gases. Certain types of zeolites find application in various processes in petroleum refineries and many other applications. The zeolite pores can form sites for catalytic reactions, and can also form channels that are selective for the passage of certain compounds and/or isomers to the exclusion of others. Zeolites can also possess an acidity level that enhances its efficacy as a catalytic material or adsorbent, alone or with the addition of active components. Described below is only one of the hundreds of types of zeolites that are identified by the International Zeolite Association (IZA). Properties and uses of many of these are well known.

Zeolite Y (also known as Na-Y zeolite or Y-type faujasite zeolite) is a well-known material for its zeolites have ion-exchange, catalytic and adsorptive properties. Zeolite Y is also a useful starting material for production of other zeolites such as ultra-stable y-type zeolite (USY). Like typical zeolites, faujasite is synthesized from alumina and silica sources, dissolved in a basic aqueous solution and crystallized. The faujasite zeolite has a framework designated as FAU by the IZA, and are formed by 12-ring structures having made of supercages with pore opening diameters of about 7.4 angstroms (Å) and sodalite cages with pore opening diameters of about 2.3 Å. Faujasite zeolites are characterized by a 3-dimensional pore structure with pores running perpendicular to each other in the x, y, and z planes. Secondary building units can be positioned at 4, 6, 6-2, 4-2, 1-4-4 or 6-6. An example silica-to-alumina ratio (SAR) range for faujasite zeolite is about 2 to about 6, typically with a unit cell size (units a, b and c) in the range of about 24.25 to 24.85 Å. Faujasite zeolites are typically considered X-type when the SAR is at about 2-3, and Y-type when the SAR is greater than about 3, for instance about 3-6. Typically, faujasite is in sodium form and can be ion exchanged with ammonium, and an ammonium form can be calcined to transform the zeolite to its proton form.

Whereas zeolites have found great utility in their ability to select between small molecules and different cations, mesoporous solids (pores between about 20 and 500 Å) offer possibilities for applications for species up to an order of magnitude larger in dimensions such as nanoparticles and enzymes. The comparatively bulky nature of such species hinders diffusion through the microporous zeolite network, and thus, a larger porous system is required to effectively perform an analogous molecular sieving action for the larger species.

Mesoporous silicas are amorphous; however, it is the pores that possess long-range order with a periodically aligned pore structure and uniform pore sizes on the mesoscale. Mesoporous silicas offer high surface areas and can be used as host materials to introduce additional functionality for a diverse range of applications such as adsorption, separation, catalysis, drug delivery and energy conversion and storage.

An attractive property of ordered structures is that their architecture may be described in relation to their symmetry. The regular form of crystals is associated with the regular arrangements of the sub-units comprising the crystal, and hence, the symmetry of the crystal is connected to the symmetry of the sub-units. For example, seven distinct three-dimensional crystal units are provided in Table 1. The crystal systems can be sub-divided upon the symmetry elements present, collectively referred to as the point group and provided in Table 2. For example, 3m infers that a mirror plane having a three-fold axis is present. For the class 3/m (or 6) the mirror plane is perpendicular to the three-fold axis. In 2D space, such as a lamellar system, having fewer dimensions than 3D, there are four crystal systems: hexagonal, square, rectangular and oblique.

The well-defined microporous structure of zeolites provides an amalgam of important physicochemical functionalities that are highly desirable in various industrial practices. Their molecular-sized pore channels embedded with tunable acid/base sites can geometrically discriminate the ingress of guest species and direct shape-selective transformations. Such remarkable properties uniquely exhibited by zeolites demonstrate unprecedented importance in numerous chemical technologies, including but not limited to oil-refining, detergents and effluent abatement, that profoundly impact the global economy and environment. However, zeolite performance is often hindered as a result of their poor mass-transfer abilities induced by configurational diffusion inside the narrow micropores. Therefore, mitigation of the intrinsic mass-transfer limitations is important to explore the full potential of zeolites in diverse energy economies and thereby enhance the accessibility to internal functional sites. Other drawbacks of microporous zeolites as catalysts in certain reactions are their susceptibility to coking, which can lead to accelerated deactivation of catalysts and product selectivity.

In this regard, hierarchically ordered zeolites (HOZs) possessing an ordered mesoporous structure and zeolitized mesopore walls are of great technological importance due to their exceptional properties. HOZs contain different layers of porosity, that is, mesopores and micropores. Hierarchically ordered zeolites offer advantages over traditional microporous zeolites by, for example, improving diffusion of guest species to the active sites, overcoming steric limitations, improving product selectivity, decreasing coke formation, improving hydrothermal stability, and improving accessibility of Brønsted acid sites and Lewis acid sites; and concomitantly, improved catalytic performance.

Numerous synthetic strategies to produce hierarchical zeolites are known, and fall under two general categories: bottom-up approaches which include the use of hard templates and soft templates, and top-down approaches which typically involve post-synthetic treatment. Bottom-up strategies generally involve templating techniques used in situ during zeolite crystallization, for example using hard templates (carbon sources) or soft templates (surfactants). Top-down strategies generally involve post-synthetic modifications of already formed zeolite crystals, for example, by steaming, dealumination (using an acid) or desilication (using a base). Weaknesses of known processes to produce hierarchically ordered zeolites is that the long-rage ordering of the mesophase in the resulting zeolite is limited or non-existent, and mesopores can be random in size, location and ordering.

Base-mediated desilication offers a direct route to creating mesoporosity in high-silica frameworks obtained from steaming. (see, e.g.: Verboekend, D., Milina, M., Mitchell, S. & Perez-Ramirez, J. Hierarchical Zeolites by Desilication: Occurrence and Catalytic Impact of Recrystallization and Restructuring. *Crys. Growth Des.* 13, 5025-5035 (2013)). In particular, integrating organic templates during the desilication process has significantly improved crystallinity and mesoporosity. (see, e.g.: García-Martínez, J., Johnson, M., Valla, J., Li, K. & Ying, J. Y. Mesostructured Zeolite Y—High Hydrothermal Stability and Superior FCC Catalytic Performance. *Catal. Sci. Tech.* 2, 987 (2012); Mendoza-Castro, M. J., Serrano, E., Linares, N. & García-Martínez, J. Surfactant-Templated Zeolites: From Thermodynamics to Direct Observation. *Adv. Mater. Interfaces* 8, 2001388 (2020)). However, such post-synthetic modification strategies typically lack control over the dissolution and self-assembly process, resulting in poorly interconnected mesopores. (see, e.g.: Schwieger, W. et al. Hierarchy Concepts: Classification and Preparation Strategies for Zeolite Containing Materials with Hierarchical Porosity. *Chem. Soc. Rev.* 45, 3353-3376, doi: 10.1039/ c5cs00599j (2016)).

In view of the prior attempts to produce hierarchically ordered zeolites, there remains a need in the art for hierarchically ordered zeolites. It is in regard to these and other problems in the art that the present disclosure is directed to provide a technical solution for compositions of hierarchically ordered zeolites having well-defined long-range mesoporous ordering having cubic symmetry.

SUMMARY OF THE DISCLOSURE

A composition of matter is provided comprising crystalline microporous material such as zeolites or zeolite-type materials that are hierarchically ordered. These hierarchically ordered crystalline microporous materials have well-defined long-range mesoporous ordering of cubic symmetry comprising mesopores having walls of crystalline microporous material and a mass of mesostructure between mesopores composed of the crystalline microporous material. Long-range ordering is defined by presence of secondary peaks in an X-ray diffraction (XRD) pattern and/or cubic symmetry observable by microscopy.

In certain embodiments, a composition of matter comprises hierarchically ordered crystalline microporous material having well-defined long-range mesoporous ordering of cubic symmetry comprising mesopores having walls composed of crystalline microporous material and a mass of mesostructure between mesopores of crystalline microporous material. At least a portion of the mesopores contain micelles of supramolecular templates shaped to induce mesoporous ordering of cubic symmetry. The supramolecular templates possess one or more dimensions larger than dimensions of micropores of the crystalline microporous material to constrain diffusion into micropores of the crystalline microporous material, wherein the dimensions relate to a head group of a supramolecular template, a tail group of a supramolecular template, or a co-template arrangement that constrain diffusion into micropores of the crystalline microporous material. In certain embodiments, an ionic co-solute is present in the hierarchically ordered crystalline microporous material; in certain embodiments, an ionic co-solute comprises $NO_3^-$. In certain embodiments, the supramolecular template is characterized by a surfactant packing parameter g in the range of about 0.4-0.8, wherein g, $g=V/a_0l$, wherein V=total volume of surfactant tails of the supramolecular template, $a_0$=area of the head group of the supramolecular template, and l=length of surfactant tail of the supramolecular template. In certain embodiments, a molar ratio of supramolecular template to co-solute is in the range of about 0.8-1.3.

In certain embodiments, the cubic mesophase possess Ia-3d, Fm-3m, Pm-3n, Pn-3m or Im-3m symmetry. In certain embodiments, the cubic mesophase possess Ia-3d symmetry and secondary peaks in XRD are present at one or more of (220), (321), (400), (420) or (332) reflections. In certain embodiments, the cubic mesophase possess Ia-3d symmetry and long-range ordering is observable by microscopy viewing an electron beam down a [311], [111] or [110] zone axis. In certain embodiments, the cubic mesophase possess Fm-3m symmetry and long-range ordering is observable by microscopy viewing an electron beam down a or zone axis.

In certain embodiments, the said parent crystalline microporous material comprises a zeolite or zeolite-type material. For example, the parent crystalline microporous material is a zeolite having a framework selected from the group consisting of AEI, *BEA, CHA, FAU, MFI, MOR, LTL, LTA and MWW. In certain embodiments the parent crystalline microporous material is a zeolite having FAU framework.

In certain embodiments, a hydrocracking catalyst is provided comprising the hierarchically ordered zeolite described herein, an inorganic oxide component as a binder, and an active metal component. For example, the hierarchically ordered crystalline microporous material comprises about 0.1-99, 0.1-90, 0.1-80, 0.1-70, 0.1-50, 0.1-40, 2-99, 2-90, 2-80, 2-70, 2-50, 2-40, 20-100, 20-90, 20-80, 20-70, 20-50, or 20-40 wt % of the hydrocracking catalyst. An inorganic oxide component is selected from the group consisting of alumina, silica, titania, silica-alumina, alumina-titania, alumina-zirconia, alumina-boria, phosphorus-alumina, silica-alumina-boria, phosphorus-alumina-boria, phosphorus-alumina-silica, silica-alumina-titania, silica-alumina-zirconia, alumina-zirconia-titania, phosphorus-alumina-zirconia, alumina-zirconia-titania and phosphorus-alumina-titania. In certain embodiments, the inorganic oxide component comprises alumina. In certain embodiments, the zeolite comprises FAU zeolite. In certain embodiments, the active metal component comprises one or more of Mo, W, Co or Ni (oxides or sulfides). The active metal component comprises one or more metals selected from the Periodic Table of the Elements IUPAC Groups 6, 7, 8, 9 or 10.

In certain embodiments, a method for hydrocracking hydrocarbon oil is provided, comprising hydrocracking hydrocarbon oil with a hydrocracking catalyst including the hierarchically ordered zeolite described herein. In certain embodiments, the hydrocarbon oil comprises a recycle stream obtained from hydrocracking of VGO, straight run VGO or pre-treated straight run VGO, with selectivity to naphtha and middle distillates tailored as a function of the cubic symmetry mesophase.

Any combinations of the various embodiments and implementations disclosed herein can be used. These and other aspects and features can be appreciated from the following description of certain embodiments and the accompanying drawings and claims.

BRIEF DESCRIPTION OF THE DRAWINGS

The process of the disclosure will be described in more detail below and with reference to the attached drawings in which the same number is used for the same or similar elements.

FIGS. 5A-5C depict TEM micrographs of hierarchically ordered zeolite synthesized in Example 1B.

FIGS. 8A-8C depict TEM micrographs of hierarchically ordered zeolite synthesized in Example 1C.

DETAILED DESCRIPTION OF CERTAIN EMBODIMENTS OF THE DISCLOSURE

Figure 1:
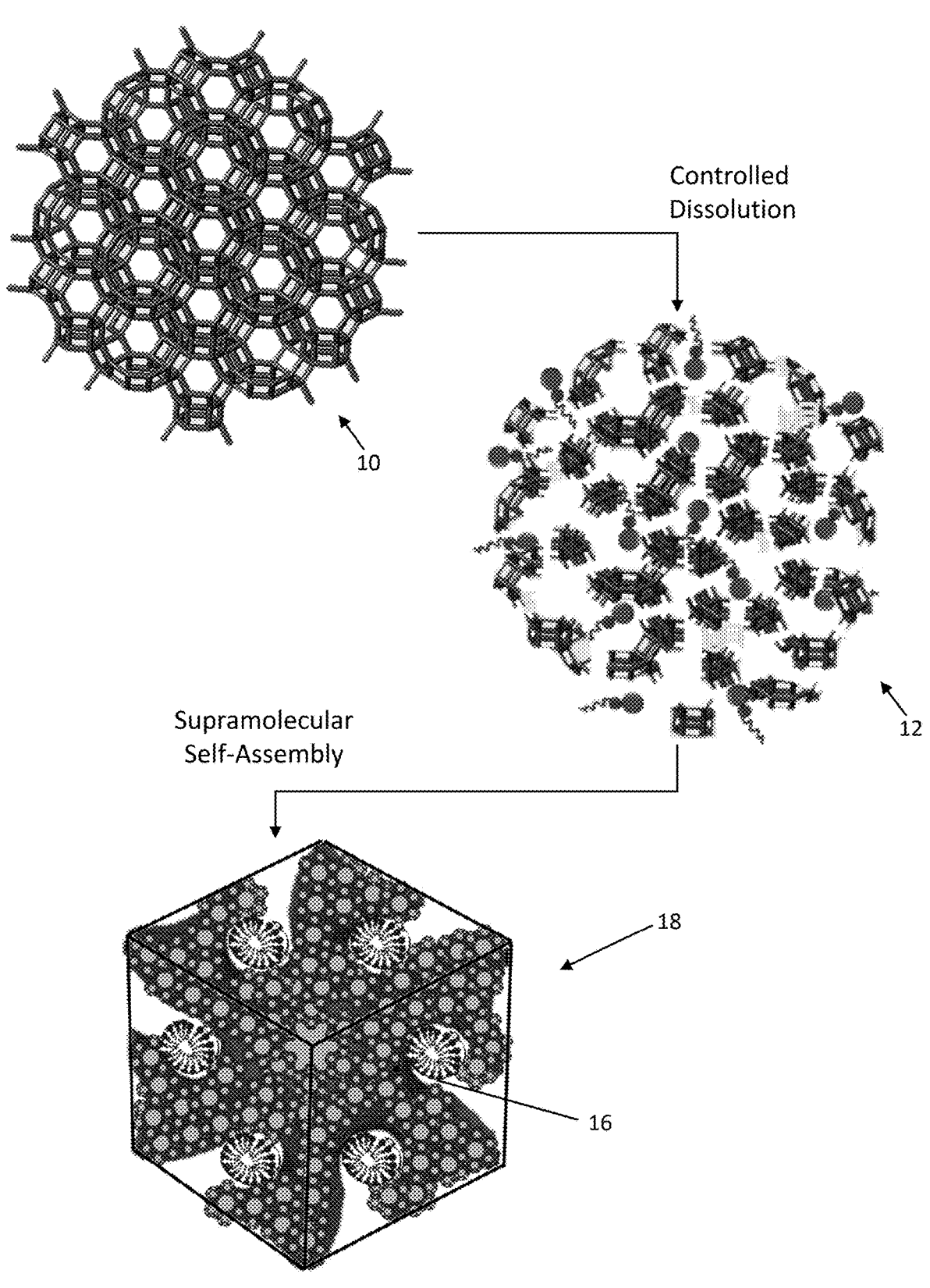
FIGS. 1 and 2 are schematic overviews of hierarchical ordering by post-synthetic ensembles synthesis route described herein.

A composition of matter is provided comprising crystalline microporous material ("CMM") that are hierarchically ordered. These hierarchically ordered crystalline microporous materials ("HOCMM") have well-defined long-range mesoporous ordering of cubic symmetry comprising mesopores having walls of crystalline microporous material and a mass of mesostructure between mesopores of CMM. The long-range ordering is defined by presence of secondary peaks in an X-ray diffraction (XRD) pattern and/or cubic symmetry observable by microscopy. In certain embodiments, for example prior to calcination of synthesized HOCMMs, at least a portion of the mesopores contain micelles of supramolecular templates shaped to induce mesoporous ordering of cubic symmetry, and wherein the supramolecular templates possess one or more dimensions larger than dimensions of micropores of the crystalline microporous material to constrain diffusion into micropores of the crystalline microporous material. The dimensions relate to a head group of a supramolecular template, a tail group of a supramolecular template, or a co-template arrangement that constrain diffusion into micropores of the CMM. The HOCMMs are synthesized using by base-mediated reassembly, by dissolution of the parent CMM to the level of structural building units that are oligomers of the parent CMM, and minimizing or avoiding amorphization/structural collapse. The CMM dissolution and self-assembly is comprehensively controlled to produce HOCMMs according to the methods herein having mesoporous ordering of cubic symmetry, including embodiments with the use of an ionic co-solute. A method to make compositions including those disclosed herein are disclosed in co-pending and commonly owned United Stated patent application Ser. No. 17/857,671 filed on Jul. 5, 2022, and United Stated patent application Ser. No. 18/151,782 filed on Jan. 9, 2023, both entitled "Methods for Synthesis of Hierarchically Ordered Crystalline Microporous Materials with Long-Range Mesoporous Order," and both of which are incorporated by reference herein.

In certain embodiments of reassembly to produce the composition of matter herein: the rate and extent of CMM dissolution is controlled by employing urea as an in situ base, and by mediating hydrothermal temperature to control urea hydrolysis and fine-tune pH of the solution; extent of dissolution into smaller oligomers is controlled by the surfactant-CMM interactions during the initial stages of dissolution, whereby influence of the ion-specific interactions, that is, anionic Hofmeister effect (AHE) on supramolecular self-assembly directs formation of hierarchically ordered structures with bicontinuous gyroid cubic mesopore symmetry; in certain embodiments the hierarchically ordered structures possess bicontinuous gyroid cubic Ia-3d mesopore symmetry.

According to an embodiment of a method to produce the composition of matter herein, a parent CMM is formed into an aqueous suspension with an alkaline reagent and a supramolecular templating agent. In additional embodiments, the aqueous suspension includes an ionic co-solute as an additional anion that is separate from the anion which is paired with the cation of the supramolecular template. The system is maintained under conditions to induce incision of the parent CMM into oligomeric units of the CMM, with only a minor portion of monomeric units, and to induce hierarchical reassembly of the oligomeric units into mesostructures. System conditions (including temperature and time of crystallization), selection and concentration of supramolecular template, and selection and concentration of alkaline reagent are tailored to control incision of the parent CMM into oligomeric units and to control reassembly of those oligomeric units around the shape(s) of supramolecular template micelles. Dissolution of parent CMM is encouraged to the extent of oligomer formation while minimizing monomer formation, which is controlled by selection of supramolecular template, alkaline reagent, optional ionic co-solute and hydrothermal conditions (including temperature and time). In certain embodiments, a substantial portion, a significant portion or a major portion of the parent CMM is cleaved into oligomeric units, with any remainder in the form of monomeric units or atomic constituents of the CMM. In certain embodiments, dimensions of the oligomeric units correspond approximately to the wall thickness of the synthesized mesoporous structure, the HOCMM. In certain embodiments interface curvature(s) of the micelles and oligomeric units under reassembly is tuned to a desired mesostructure and mesoporosity with the aid of optional ionic co-solute and the Hofmeister effect.

Under effective crystallization conditions and time, and using effective type(s) of supramolecular template and alkaline reagent at effective relative concentrations, hierarchical ordering by post-synthetic ensembles occurs: the parent CMM is incised into oligomeric CMM units that rearrange around the shaped micelles formed by the supramolecular templates. Hierarchically ordered CMMs having well-defined long-range mesoporous ordering are formed by the supramolecular templating method using the surfactant micelles. The mesopore walls are characterized by the parent CMM. The effective supramolecular templates include those having one or more properties forming a dimension that blocks all, a substantial portion, a significant portion or a major portion of the supramolecular template molecules from entering pores, channels and/or cavities of the parent CMM. These methods disclosed herein effectuate base-mediated incisions of the CMM crystals, in the presence of the supramolecular template of the type/characteristic disclosed herein, into oligomeric components, with subsequent reorganization around well-defined micelles by supramolecular templating, into hierarchically ordered structures having a well-defined long-range mesoporous ordering of 3D-cubic symmetry.

The curvature or shape of the micelles results in the final 3D-cubic mesophase symmetry. Formation of the supramolecular template molecules into micelles is dependent upon factors such as the supramolecular template type, supramolecular template concentration, presence or absence of an ionic co-solute, CMM type(s), crystallization temperature, type of alkaline reagent, concentration of alkaline reagent, pH level of the system, and/or presence or absence of other reagents. In general, at low concentrations supramolecular templates exist as discrete entities. At higher concentrations, that is, above a critical micelle concentration (CMC), micelles are formed. The hydrophobic interactions in the system including the supramolecular template alters the packing shape of the supramolecular templates into, for example, spherical, prolate or cylindrical micelles, which can thereafter form thermodynamically stable two-dimensional or three-dimensional liquid crystalline phases of ordered mesostructures (see, for example, FIG. 1.4 of Zana, R. (Ed.). (2005). Dynamics of Surfactant Self-Assemblies: Micelles, Microemulsions, Vesicles and Lyotropic Phases (1$^{st}$ ed.). CRC Press, Chapter 1, which shows self-assembly based on surfactant and surfactant packing parameter).

In certain embodiments, the Hofmeister series (HS), ion specific effect, or lyotropic sequence is followed for selection of supramolecular templates and/or ionic co-solute to control curvature or shape (e.g., spherical, ellipsoid, cylindrical, or unilamellar structures) of the micelles (see, for example, Beibei Kang, Huicheng Tang, Zengdian Zhao, and Shasha Song. "Hofmeister Series: Insights of Ion Specificity from Amphiphilic Assembly and Interface Property" ACS Omega 5 (2020): 6229-6239). In embodiments of the methods for synthesis of hierarchically ordered microporous crystalline materials having well-defined long-range mesoporous ordering disclosed herein, mesophase transitions of hierarchical ensembles yield distinct mesostructures based on the anionic Hofmeister effect and supramolecular self-assembly. Anions of different sizes and charges possess different polarizabilities, charge densities and hydration energies in aqueous solutions. When paired with a positive supramolecular template head group, these properties can affect the short-range electrostatic repulsions among the head groups and hydration at the micellar interface, thus changing the area of the head group ($a_0$). Such ion-specific interactions can be a driving force in changing the micellar curvature and inducing mesophase transition. Based on the HS ($SO_4^{2-}>HPO_4^{2-}$-22 $OAc^->Cl^->Br^->NO_3^->ClO_4^->SCN^-$), strongly hydrated ions (left side of the HS) can increase the micellar curvature, whereas weakly hydrated ions can decrease the micellar curvature. A surfactant packing parameter, $g=V/a_0l$ (V=total volume of surfactant tails, $a_0$=area of the head group, l=length of surfactant tail), can be used to describe these mesophase transitions. In embodiments herein, the hierarchically ordered structures having a well-defined long-range mesoporous ordering of 3D-cubic symmetry are formed by selecting a supramolecular template and an ionic co-solute.

In the methods for synthesis of hierarchically ordered CMMs having well-defined long-range mesoporous ordering disclosed herein, suitable alkaline reagents include one or more basic compounds to maintain the system at a pH level of greater than about 8. In certain embodiments the alkaline reagent is provided at a concentration in the aqueous suspension of about 0.1-2.0 M. In certain embodiments the alkaline reagent is provided at a concentration in the aqueous suspension of about 0.1-5 wt %. In certain embodiments the alkaline reagent comprises urea. In certain embodiments the alkaline reagent comprises ammonia. In certain embodiments the alkaline reagent comprises ammonium hydroxide. In certain embodiments the alkaline reagent comprises sodium hydroxide. In certain embodiments the alkaline reagent comprises alkali metal hydroxides including hydroxides of sodium, lithium, potassium, rubidium, or cesium.

In certain embodiments the alkaline reagent is effective to enable controlled hydrolysis; for example, urea can be used as an alkaline agent, and during hydrolysis urea reacts to form ammonium hydroxide. For example, higher urea concentration can be used in the initial step, and basicity can be maintained by gradual urea hydrolysis. In such embodiments, pH is increased relatively slowly to a maximum pH as a function of time, which is beneficial to the process, rather than adding an amount of another alkaline reagent such as ammonium hydroxide in the initial solution to the maximum pH. Unlike conventional bases, which act swiftly, urea is pH neutral at ambient conditions and can disperse uniformly throughout the zeolitic micropores without affecting them.

In certain embodiments the alkaline reagent comprises alkylammonium cations, having the general formula $R_xH_{4-x}N^+[A^-]$, wherein at X=1-4 and $R_1$, $R_2$, $R_3$ and $R_4$ can be the same or different C1-C30 alkyl groups, and wherein $[A^-]$ is a counter anion can be $OH^-$, $Br^-$, $Cl^-$ or $I^-$. In certain embodiments the alkaline reagent comprises quaternary ammonium cations with alkoxysilyl groups, phosphonium groups, an alkyl group with a bulkier substituent or an alkoxyl group with a bulkier substituent. In certain embodiments the alkylammonium cations used in this regard function as a base rather than as a surfactant or template.

In certain embodiments using ammonia, ammonium hydroxide or alkali metal hydroxides, amorphous material is also present with the crystalline material in the product. In certain embodiments, upon calcining the as-made HOCMMs there is a reduction in the amount of apparent amorphous material present (for example an overall broad band at 25° (2θ) in XRD), indicative of apparent "selfhealing" after calcination. In certain embodiments, by the controlled hydrolysis of urea to ammonium hydroxide there is a reduction in the amount of apparent amorphous material present in the HOCMMs (for example an overall broad band at 25° (2θ) in XRD), when compared with alternative routes such as NaOH or directly with ammonium hydroxide.

In the methods for synthesis of hierarchically ordered CMMs having well-defined long-range mesoporous ordering disclosed herein, suitable surfactants as supramolecular templates are provided to assist the reassembly and recrystallization of dissolved components (oligomers) by covalent and/or electrovalent interactions. Supramolecular templates are provided at a concentration in the aqueous suspension of about 0.01-0.5 M. In certain embodiments suitable supramolecular templates are provided at a concentration in the aqueous suspension of about 0.5-10 wt %. Suitable supramolecular templates are characterized by constrained diffusion within the micropore channels of parent CMM, referred to as bulky surfactants or bulky supramolecular templates. Diffusion of supramolecular template molecules into micropore-channels or cavities encourages CMM dissolution. This is minimized in the top-down methods for synthesis of hierarchically ordered CMMs having well-defined long-range mesoporous ordering disclosed herein, wherein effective supramolecular templates minimize diffusion or partial diffusion thereof into CMM pore-channels, cavities or window openings. Such supramolecular templates possess suitable dimensions to block such diffusion. The suitable dimensions can be a based on dimensions of a head group and/or a tail group of a supramolecular template. In certain embodiments suitable dimensions can be based on a co-template having one or more components with suitable head and/or tail groups, or being a template system arranged in such a way, so as to minimize or block diffusion in to CMM pore-channels, cavities or window openings. By minimizing diffusion of templates into the CMM pore channels, CMM dissolution into oligomers and comprehensive reorganization and assembly into the hierarchically ordered CMMs having well-defined long-range mesoporous ordering disclosed herein is encouraged. In certain embodiments, a supramolecular template is one in which at least a substantial portion, a significant portion or a major portion of the surfactant does not enter into pores and/or channels of the CMM. For example, organosilanes (~0.7 nm) are relatively large compared to quaternary ammonium surfactants without such bulky groups including cetyltrimethylammonium bromide (CTAB) (~0.25 nm). In certain embodiments, a supramolecular template contains a long chain linear group (>~0.6 nm). In certain embodiments, a supramolecular template contains an aromatic or aromatic derivative group (>~0.6 nm). In certain embodiments, supramolecular templates contain one or more bulky groups having a dimension based on modeling of molecular dimensions as a cuboid having dimensions A, B and C, using Van der Waals radii for individual atoms, wherein one or more, two or more, or all three of the dimensions A, B and C are sufficiently close in dimension, or sufficiently larger in dimension, that constrains diffusion into the micropores of the selected parent CMM.

In certain embodiments an effective surfactant as a supramolecular template contains at least one moiety, as a head group or a tail group, selected from the group consisting of organosilanes, hydroxysilyls, alkoxysilyls, aromatics, branched alkyls, sulfonates, carboxylates, phosphates and combinations comprising one of the foregoing moieties. In certain embodiments an effective supramolecular template is an organosilane that contains at least one hydroxysilyl as a head group moiety. In certain embodiments an effective supramolecular template is an organosilane that contains at least one hydroxysilyl as a tail group moiety. In certain embodiments an effective supramolecular template is an organosilane that contains at least one alkoxysilyl as a head group moiety. In certain embodiments an effective supramolecular template is an organosilane that contains at least one alkoxysilyl as a tail group moiety. In certain embodiments an effective supramolecular template contains at least one aromatic as a head group moiety. In certain embodiments an effective supramolecular template contains at least one aromatic as a tail group moiety. In certain embodiments an effective supramolecular template contains at least one branched alkyl as a head group moiety. In certain embodiments an effective supramolecular template contains at least one branched alkyl as a tail group moiety. In certain embodiments an effective supramolecular template contains at least one sulfonate as a head group moiety. In certain embodiments an effective supramolecular template contains at least one sulfonate as a tail group moiety. In certain embodiments an effective supramolecular template contains at least one carboxylate as a head group moiety. In certain embodiments an effective supramolecular template contains at least one carboxylate as a tail group moiety. In certain embodiments an effective supramolecular template contains at least one phosphate as a head group moiety. In certain embodiments an effective supramolecular template contains at least one phosphate as a tail group moiety. These moieties are characterized by one or more dimensions that constrain diffusion into pores of a parent CMM. In certain embodiments, in which the CMM is characterized by pores of various dimensions, the selected moieties are characterized by one or more dimensions that constrain diffusion into the largest pores the parent CMM.

In certain embodiments an effective supramolecular template contains at least one cationic moiety. In certain embodiments an effective supramolecular template contains at least one cationic moiety selected from the group consisting of a quaternary ammonium moiety and a phosphonium moiety. In certain embodiments an effective supramolecular template contains at least one quaternary ammonium group having a terminal alkyl group with 6-24 carbon atoms. In certain embodiments an effective supramolecular template contains two quaternary ammonium groups wherein an alkyl group bridging the quaternary ammonium groups contains 1-10 carbon atoms. In certain embodiments an effective supramolecular template contains at least one quaternary ammonium group, and at least one constituent group, a head group moiety as described above. In certain embodiments an effective supramolecular template contains at least one quaternary ammonium group, and at least one constituent group, a tail group moiety as described above. In certain embodiments an effective supramolecular template contains at least one quaternary ammonium group, at least one constituent group, a head group moiety as described above, and an alkyl group that contains 1-10 carbon atoms bridging at least one of the quaternary ammonium groups and at least one of the head groups. In certain embodiments an effective supramolecular template contains at least one quaternary ammonium group, at least one constituent group, a tail group moiety as described above, and an alkyl group that contains 1-10 carbon atoms bridging at least one of the quaternary ammonium groups and at least one of the tail groups.

In certain embodiments an effective supramolecular template comprises a quaternary ammonium compound and a constituent group comprising one or more bulky organosilane or alkoxysilyl substituents. In certain embodiments an effective supramolecular template comprises a quaternary ammonium compound and a constituent group comprising one or more long-chain organosilane or alkoxysilyl substituents. In certain embodiments an effective supramolecular template cation comprises dimethyloctadecyl(3-trimethoxysilyl-propyl)-ammonium or derivatives of dimethyloctadecyl(3-trimethoxysilyl-propyl)-ammonium. In certain embodiments an effective supramolecular template cation comprises dimethylhexadecyl(3-trimethoxysilyl-propyl)-ammonium or derivatives of dimethylhexadecyl(3-trimethoxysilyl-propyl)-ammonium. In certain embodiments an effective supramolecular template cation comprises a double-acyloxy amphiphilic organosilane such as [2,3-bis(dodecanoyloxy)-propyl](3-(trimethoxysilyl) propyl)-dimethylammonium or derivatives of [2,3-bis(dodecanoyloxy)-propyl](3-(trimethoxysilyl) propyl)-dimethylammonium.

In certain embodiments an effective supramolecular template comprises a quaternary phosphonium compound and a constituent group comprising one or more bulky aromatic substituents. In certain embodiments an effective supramolecular template comprises a quaternary phosphonium compound and a constituent group comprising one or more bulky alkoxysilyl or organosilane substituents.

In certain embodiments an effective supramolecular template contains a tail group moiety selected from the group consisting of aromatic groups containing 6-50, 6-25, 10-50 or 10-25 carbon atoms, alkyl groups containing 1-50, 1-25, 5-50, 5-25, 10-50 or 10-25 carbon atoms, aryl groups containing 1-50, 1-25, 5-50, 5-25, 10-50 or 10-25 carbon atoms, or a combination of aromatic and alkyl groups having up to 50 carbon atoms. In certain embodiments an effective supramolecular template contains a head group moiety selected from the group consisting of aromatic groups containing 6-50, 6-25, 10-50 or 10-25 carbon atoms, alkyl groups containing 1-50, 1-25, 5-50, 5-25, 10-50 or 10-25 carbon atoms, aryl groups containing 1-50, 1-25, 5-50, 5-25, 10-50 or 10-25 carbon atoms, or a combination of aromatic and alkyl groups having up to 50 carbon atoms. In certain embodiments an effective supramolecular template contains co-templated agents selected from the group consisting of quaternary ammonium compounds (including for example quaternary alkyl ammonium cationic species) and quaternary phosphonium compounds.

In certain embodiments effective supramolecular templates comprise (a) at least one of: aromatic quaternary ammonium compounds, branched alkyl chain quaternary ammonium compounds, alkyl benzene sulfonates, alkyl benzene phosphonates, alkyl benzene carboxylates, or substituted phosphonium cations; and (b1) and a constituent group comprising at least one of organosilanes, hydroxysilyls, alkoxysilyls, aromatics, branched alkyls, sulfonates, carboxylates or phosphates, as a head group; or (b2) and a constituent group comprising at least one of organosilanes, hydroxysilyls, alkoxysilyls, aromatics, branched alkyls, sulfonates, carboxylates or phosphates, as a tail group. In certain embodiments effective supramolecular templates include a sulfonate group (a non-limiting example is sulfonated bis(2-hydroxy-5-dodecylphenyl)methane (SBHDM)). In certain embodiments effective supramolecular templates include a carboxylate group (a non-limiting example is sodium 4-(octyloxy) benzoate). In certain embodiments effective supramolecular templates include a phosphonate group (a non-limiting example is tetradecyl (1,4-benzene) bisphosphonate). In certain embodiments effective supramolecular templates include an aromatic group (a non-limiting example is benzylcetyldimethylammonium chloride). In certain embodiments effective supramolecular templates include an aliphatic group (a non-limiting example is tetraoctylammonium chloride).

The supramolecular template is provided as a cation/anion pair. In certain embodiments a cation of a supramolecular template is as described above is paired with an anion selected such as $Cl^-$, $Br^-$, $OH^-$, $F^-$ and $I^-$. In certain embodiments a cation of a supramolecular template is as described above is paired with an anion such as $Cl^-$, $Br^-$ or $OH^-$. In certain embodiments an effective supramolecular template comprises dimethyloctadecyl[3-(trimethoxysilyl) propyl] ammonium chloride (commonly abbreviated as "TPOAC") or derivatives of dimethyloctadecyl[3-(trimethoxysilyl)propyl] ammonium chloride. In certain embodiments an effective supramolecular template comprises dimethylhexadecyl[3-(trimethoxysilyl)propyl] ammonium chloride or derivatives of dimethylhexadecyl[3-(trimethoxysilyl)propyl] ammonium chloride. In certain embodiments an effective supramolecular template comprises [2,3-bis(dodecanoyloxy)-propyl](3-(trimethoxysilyl) propyl)-dimethylammonium iodide or derivatives of [2,3-bis (dodecanoyloxy)-propyl](3-(trimethoxysilyl)propyl)-dimethylammonium iodide.

In certain embodiments, the system includes an effective amount of an ionic co-solute (that is, in addition to the anion paired with the supramolecular template). In certain embodiments in which an ionic co-solute is used it is provided at a concentration in the aqueous suspension of about 0.01-0.5 M. In certain embodiments in which an ionic co-solute is used it is provided at a concentration in the aqueous suspension of about 0.01-5 wt %. In certain embodiments an ionic co-solute is selected from the group consisting of $CO_3^{2-}$, $SO_4^{2-}$, $S_2O_3^{2-}$, $H_2PO_4^-$, $F^-$, $Cl^-$, $Br^-$, $NO_3^-$, $I^-$, $ClO_4^-$, $SCN^-$ and $C_6H_5O_8^{-3}$ (citrate). In certain embodiment an ionic co-solute is selected based on the Hofmeister series/Lyotropic series to control the curvature/shape of the micelles to yield the desired cubic mesophase symmetry. In certain embodiments a nitrate ($NO_3^-$) is an ionic co-solute selected based on the Hofmeister series/Lyotropic series to control the curvature/shape of the micelles to yield hierarchically ordered CMMs having well-defined long-range mesoporous ordering possess a cubic mesophase symmetry; in certain embodiments using nitrate as an ionic co-solute, a nitrate salt is used, such as ammonium nitrate or a metal nitrate, wherein the metal can be an alkali metal, an alkali earth metal, a transition metal, a noble metal or a rare earth metal.

The present disclosure is applicable to various types of CMMs as a parent material, including zeolite or zeolite-type materials. In certain embodiments a parent CMM exhibits both good crystallinity and Al-distribution to obtain high-quality HOCMMs while minimizing composite phases and/or impurities.

Suitable zeolitic materials as a parent CMM include those identified by the International Zeolite Association, including those with the identifiers ABW, ACO, AEI, AEL, AEN, AET, AFG, AFI, AFN, AFO, AFR, AFS, AFT, AFV, AFX, AFY, AHT, ANA, ANO, APC, APD, AST, ASV, ATN, ATO, ATS, ATT, ATV, AVE, AVL, AWO, AWW, BCT, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETL, ETR, ETV, EUO, EWO, EWS, EZT, FAR, FAU, FER, FRA, GIS, GIU, GME, GON, GOO, HEU, IFO, IFR, -IFT, -IFU, IFW, IFY, IHW, IMF, IRN, IRR, -IRY, ISV, ITE, ITG, ITH, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, MRT, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POR, POS, PSI, PTO, PTT, PTY, PUN, PWN, PWO, PWW, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, SFW, SGT, SIV, SOD, SOF, SOR, SOS, SOV, SSF, SSY, STF, STI, STT, STW, -SVR, SVV, SWY, -SYT, SZR, TER, THO, TOL, TON, TSC, TUN, UEI, UFI, UOS, UOV, UOZ, USI, UTL, UWY, VET, VFI, VNI, VSV, WEI, -WEN, YFI, YUG, ZON, *BEA, *CTH, *-EWT, *-ITN, *MRE, *PCS, *SFV, *-SSO, *STO, *-SVY and *UOE. For example, certain zeolites known to be useful in the petroleum refining industry include but are not limited to AEI, *BEA, CHA, FAU, MFI, MOR, LTL, LTA or MWW. In certain embodiments a parent zeolite can be (FAU) framework zeolite, which includes USY, for example having a micropore size related to the 12-member ring when viewed along the direction of 7.4×7.4 Å. In certain embodiments a parent zeolite can be (MFI) framework zeolite, which includes ZSM-5, for example having a micropore size related to the 10-member rings when viewed along the and directions of 5.5×5.1 A and 5.6×5.3 A, respectively. In certain embodiments a parent zeolite can be (MOR) framework zeolite, which includes mordenite zeolites, for example having a micropore size related to the 12-member ring and 8-member ring when viewed along the and directions of 6.5×7.0 Å and 2.6×5.7 Å, respectively. In certain embodiments a parent zeolite can be (*BEA) framework zeolite, which includes zeolite beta polymorph A, for example having a micropore size related to the 12-member rings when viewed along the and directions of 6.6×6.7 Å and 5.6×5.6 Å, respectively. In certain embodiments a parent zeolite can be (CHA) framework zeolite, which includes chabazite zeolite, for example having a micropore size related to the 8-member ring when viewed normal to the direction of 3.8x3.8 A. In certain embodiments a parent zeolite can be (LTL) framework zeolite, which includes Linde Type L zeolite (zeolite L), for example having a micropore size related to the 12-member ring when viewed along the direction of 7.1×7.1 Å. In certain embodiments a parent zeolite can be (LTA) framework zeolite, which includes Linde Type A zeolite (zeolite A), for example having a micropore size related to the 8-member ring when viewed along the direction of 4.1×4.1 Å. In certain embodiments a parent zeolite can be (AEI) framework zeolite, for example having a micropore size related to the 8-member ring when viewed normal to the direction of 3.8x3.8 Å. In certain embodiments a parent zeolite can be (MWW) framework zeolite, which includes MCM-22, for example having a micropore size related to the 10-member rings when viewed normal to direction 'between layers' and 'within layers' of 4.0×5.5 Å and 4.1×5.1 Å, respectively.

In certain embodiments a parent CMM is a zeolite-type material, for example, aluminophosphates (AlPO), silicon-substituted aluminophosphates (SAPO), or metal-containing aluminophosphates (MAPO). In certain embodiments a parent CMM is a zeolitic siliceous only framework material.

As described above, embodiments herein include supramolecular templates that contain one or more bulky groups having a dimension based on modeling of molecular dimensions as a cuboid having dimensions A, B and C, using Van der Waals radii for individual atoms, wherein one or more, two or more, or all three of the dimensions A, B and C are sufficiently close in dimension, or sufficiently larger in dimension, that constrains diffusion into the micropores of the CMM. Also as described above with respect to the known parameters related to pore dimensions for exemplary zeolites, such parameters influence the selection of a supramolecular template. For instance, in the examples herein, FAU zeolite is used; when the supramolecular template material was CTAB (~0.25 nm), HOCMMs were not realized; however, when the supramolecular template was an organosilane (~0.7 nm), HOCMMs were realized, as these are closer in dimension to the pore dimensions for FAU zeolite and therefore are constrained from entering such pores. Likewise, suitable supramolecular templates are determined based on a selected parent CMM.

In certain embodiments parent CMMs used in the methods are zeolites herein having a SAR suitable for the particular type of zeolite. In general, the SAR of parent zeolites can be in the range of about 2-10000, 2-5000, 2-500, 2-100, 2-80, 5-10000, 5-5000, 5-500, 5-100, 5-80, 10-10000, 10-5000, 10-500, 10-100, 10-80, 50-10000, 50-5000, 50-1000, 50-500 or 50-100. In certain embodiments the SAR of the parent zeolite is greater than or equal to 5 or 10 to achieve long-range ordering. In embodiments with a SAR of less than 10, uniform mesoporosity and certain degree of ordering is attainable, and amorphous framework material remains in the product.

Figure 2:
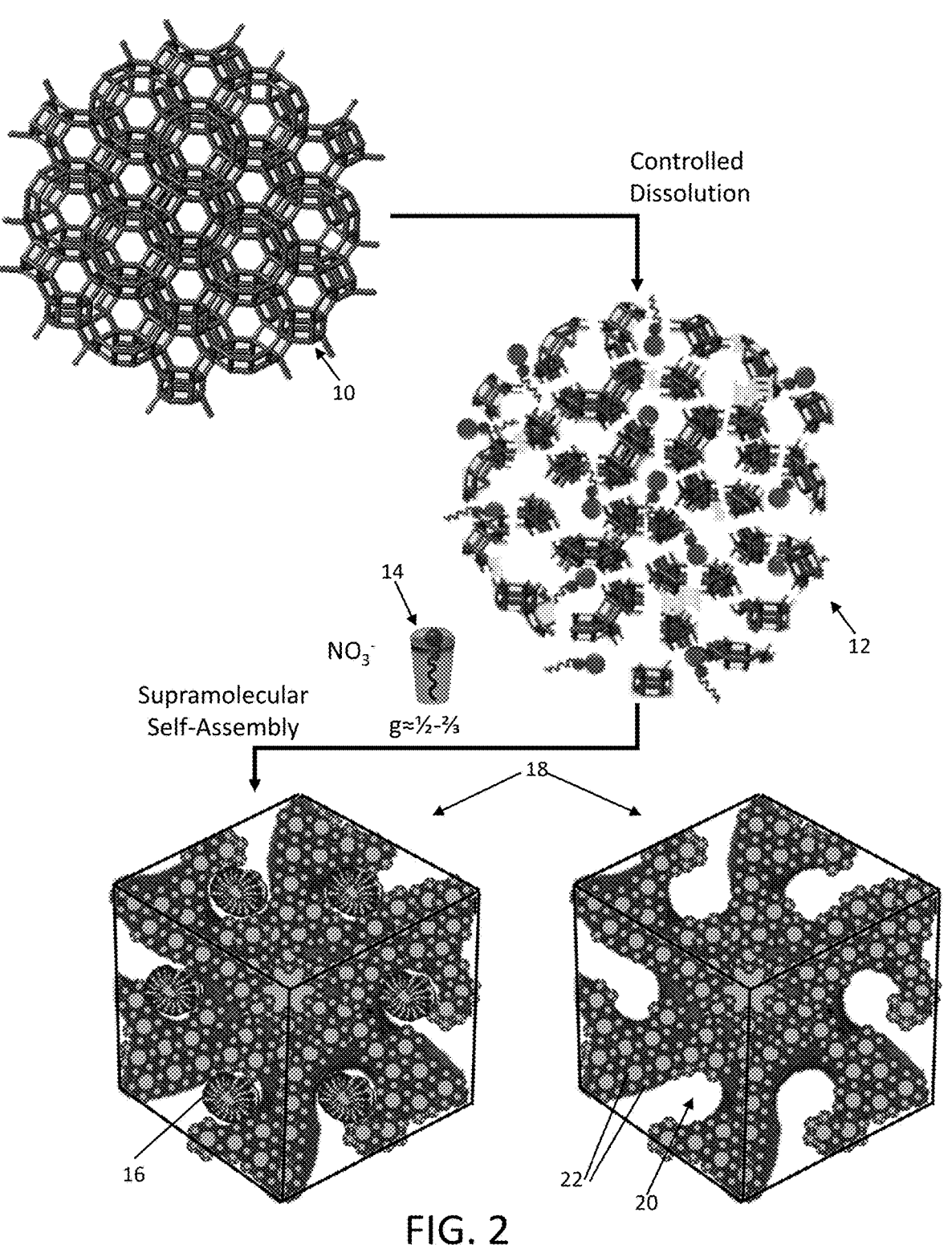

FIGS. 1 and 2 are schematic overviews of a method to make the compositions disclosed herein, using a hierarchical ordering by post-synthetic ensembles synthesis route, including the general synthesis mechanism of and how AHE influences g values to alter the micellar curvature and induce mesophase transition. Although the CMM schematically depicted in FIGS. 1 and 2 is FAU zeolite, it is appreciated that other CMMs can be utilized as a parent CMM to form the compositions herein by post-synthetic ensembles synthesis route.

The method includes base-mediated dissolution/incision of parent CMMs into oligomeric components, and reorganization into hierarchically ordered mesostructures by supramolecular templating, and in certain embodiments by the Hofmeister effect. The parent CMM 10 is provided in crystalline form. An effective amount of an alkaline reagent and an effective amount of a surfactant for supramolecular templating are added to form an aqueous suspension, and that suspension is maintained under hydrothermal conditions to form oligomeric CMM units 12 of the parent CMM (such as oligomeric zeolitic units when the parent CMM is zeolite). The supramolecular template molecules 14 form into shaped micelles 16 and oligomeric CMM units hierarchically reassemble and crystallize around the shaped micelles as an ordered mesostructure, HOCMM 18, having mesopores 20 of defined symmetry and mesopore walls formed of the oligomeric CMM units thereby retaining micropores 22 of the underlying CMM structure of the parent CMM. In certain embodiments, a composition of matter herein is the HOCMM 18 that contains shaped micelles 16. In certain embodiments, a composition of matter herein is the HOCMM 18 having the surfactant 14 formed into shaped micelles 16 removed, for example by: chemical methods such as solvent extraction, chemical oxidation, or ionic liquid treatment; or physical methods such as calcination, supercritical $CO_2$, microwave-assisted treatment, ultrasonic-assisted treatment, ozone treatment, or plasma technology.

Distinctive mesophase transitions of hierarchical ensembles to yield distinct mesostructures can be attributed to the synergetic action of the anionic Hofmeister effect (ion-specific interactions) in supramolecular self-assembly. Anions of different sizes and charges possess different polarizabilities, charge densities, and hydration energies in aqueous solutions. When paired with a positive surfactant head group, these properties can affect the electrostatic repulsions among the head groups and hydration at the micellar interface, thus changing the area of the head group ($a_0$). Such short-range ion-specific interactions can be a significant driving force in changing the micellar curvature and inducing mesophase transition.

Referring to FIG. 2, the general synthesis mechanism is shown including a schematic representation of AHE influence on g values and concomitantly the micellar curvature and the induced mesophase transition. The surfactant to co-solute molar ratio (which may be expressed as a surfactant to salt molar ratio) is effective to produce the desired mesoporous structure. The surfactant to co-solute molar ratio is selected to result in surfactant packing parameters suitable to induce the mesophase transitions to the desired geometry inducing changes to the curvature of the micelles. In certain embodiments, a nitrate is used as an ionic co-solute, the micellar curvature is represented by a surfactant packing parameter g in the range of about ½ to about ⅔, or about 0.4-0.8, 0.4-0.67, 0.5-0.8 or 0.5-0.67, and the resulting HOCMM possesses long-range mesoporous ordering of cubic symmetry. For example, in certain embodiments a surfactant to co-solute molar ratio for synthesis of HOCMM possessing long-range mesoporous ordering of cubic symmetry may be in the range of about 0.8-1.3, 0.9-1.3, 0.9-12 or 0.8-1.2. Ion-specific interactions (The Hofmeister effect) on the micellar curvature in a self-assembly process are apparent. Anions of different sizes and charges possess different polarizabilities, charge densities and hydration energies in aqueous solutions. When paired with a positive surfactant head group, these properties can affect the electrostatic repulsions among the head groups and hydration at the micellar interface, thus changing the area of the head group ($a_0$). Such short-range ion-specific interactions can be a significant driving force in changing the micellar curvature and inducing mesophase transition. Based on the Hofmeister series ($SO_4^{2-}$>$HPO_4^{2-}$>$OAc^-$>$Cl^-$>$Br^-$>$NO_3^-$>$ClO_4^-$>$SCN^-$), the strongly hydrated ions (left side of series) can increase the micellar curvature, whereas weakly hydrated ions can decrease the micellar curvature. While not wishing to be bound by theory, influence of co-solutes such as salts in mesophase ordering can be attributed to their charge-balancing effect; in the surfactant self-assembly, a high density of surfactant molecules is closely packed into micelles due to the hydrophobic effect; as a result, electrostatic repulsions of the charged head group should be minimized by the counter anions to induce facile aggregation; as such auxiliary counteranions play a role in stabilizing the micelles despite the gradual changes in the concentration of polyanionic zeolite components.

An effective amount of a solvent is used in the process. In certain embodiments the solvent is water. In certain embodiments the solvent is water in the presence of co-solvents selected from the group consisting of polar solvents, non-polar solvents and pore swelling agents (such as 1,3,5-trimethylbenzene). In certain embodiments the solvent selected from the group consisting of polar solvents, non-polar solvents and pore swelling agents (such as 1,3,5-trimethylbenzene), in the absence of water. In an embodiment, mixture components are added with water to the reaction vessel prior to heating. Typically, water allows for adequate mixing to realize a more homogeneous distribution of the suspension components, which ultimately produces a more desirable product because each crystal is more closely matched in properties to the next crystal. Insufficient mixing could result in undesirable products with respect to amorphous phases or a lesser degree of long-range order.

The suspension components are combined in any suitable sequence and are sufficiently mixed to form a homogeneous distribution of the suspension components. The suspension can be maintained in an autoclave under autogenous pressure (from the components or from the components plus an addition of a gas purge into the vessel prior to heating), or in another suitable vessel, under agitation such as by stirring, tumbling and/or shaking. Mixing of the suspension components is conducted between about 20-60, 20-50 or 20-40° C.

The steps of incision and reassembly occur during hydrothermal treatment to form a solid (product, HOCMM having well-defined long-range mesoporous ordering of 3D-cubic symmetry) suspended in a supernatant (mother liquor). Hydrothermal treatment is conducted: for a period of about 4-168, 12-168, 24-168, 4-96, 12-96 or 24-96 hours; at a temperature of about 70-250, 70-210, 70-180, 70-160, 70-150, 90-250, 90-210, 90-180, 90-160, 90-150, 110-250, 110-210, 110-180, 110-160, or 110-150° C.; and at a pressure of about atmospheric to autogenous pressure. In certain embodiments hydrothermal treatment occurs in a vessel that is the same as that used for mixing, or the suspension is transferred to another vessel (such as another autoclave or low-pressure vessel). In certain embodiments the vessel used for hydrothermal treatment is static. In certain embodiments the vessel used for hydrothermal treatment is under agitation that is sufficient to suspend the components.

The HOCMM having well-defined long-range mesoporous ordering of 3D-cubic symmetry is the product recovered. The solids are recovered using known techniques such as centrifugation, decanting, gravity, vacuum filtration, filter press, or rotary drums. The recovered HOCMM having well-defined long-range mesoporous ordering of 3D-cubic symmetry is dried, for example at a temperature of about 50-150, 50-120, 80-150 or 80-120° C., at atmospheric pressure or under vacuum conditions, for a time of about 0.5-96, 12-96 or 24-96 hours.

In certain embodiments, the dried HOCMM having well-defined long-range mesoporous ordering of 3D-cubic symmetry is calcined, for example to remove supramolecular templates that remain in the mesopores and other constituents from the mesopores and/or the discrete zeolite cell micropores. The conditions for calcination in embodiments in which it is carried out can include temperatures in the range of about 350-650, 350-600, 350-550, 500-650, 500-600 or 500-550° C., atmospheric pressure or under vacuum, and a time period of about 2.5-24, 2.5-12, 5-24 or 5-12 hours. Calcining can occur with ramp rates in the range of from about 0.1-10, 0.1-5, 0.1-3, 1-10, 1-5 or 1-3° C. per minute. In certain embodiments calcination can have a first step ramping to a temperature of between about 100-150° C. with a holding time of from about 1.5-6 or 1-12 hours (at ramp rates of from about 0.1-5, 0.1-3, 1-5 or 1-3° C. per min) before increasing to a higher temperature with a final holding time in the range of about 1.5-6 or 1-12 hours.

In certain embodiments, the supernatant remaining after recovery of product from the system is recovered, and all or a portion thereof can be reused as all or a portion of the solution in a subsequent process for synthesis of HOCMM having well-defined long-range mesoporous ordering of 3D-cubic symmetry, or another HOCMM. In this embodiment, recovered supernatant used in subsequent process is referred to as supernatant from a prior synthesis. In certain embodiments a new synthesis can occur using supernatant from a prior synthesis together with parent CMM. In certain embodiments a new synthesis can occur using supernatant from a prior synthesis together with parent CMM and an additional quantity of make-up alkaline reagent (for example urea). In certain embodiments a new synthesis can occur using supernatant from a prior synthesis together with parent CMM and an additional quantity of make-up supramolecular template. In certain embodiments a new synthesis can occur using supernatant from a prior synthesis together with parent CMM and an additional quantity of make-up ionic co-solute. In certain embodiments a new synthesis can occur using supernatant from a prior synthesis together with parent CMM and an additional quantity of make-up alkaline reagent (for example urea) and/or make-up supramolecular template and/or optional make-up ionic co-solute.

The composition of matter recovered as described herein are hierarchically ordered CMMs (such as zeolites) having well-defined long-range mesoporous ordering of 3D-cubic symmetry. These are characterized by defined mesoporous channel directions with CMM micropore channels in the walls of the mesostructure. The HOCMM having well-defined long-range mesoporous ordering recovered from synthesis possesses supramolecular template as described herein in the mesopores (that is, prior to calcination or extraction of the supramolecular template). In certain embodiments the HOCMM having well-defined long-range mesoporous ordering of 3D-cubic symmetry recovered from synthesis possesses micelles of supramolecular template as described herein in the mesopores (that is, prior to calcination or extraction of the supramolecular template). The composition of matter recovered as described herein retains the structural integrity of the microporous zeolite structure by controlled incision of the parent zeolite followed by controlled reassembly of the zeolite oligomers under a controlled micellar curvature to yield the HOCMMs with defined mesoporous 3D-cubic symmetry.

This well-defined long-range mesoporosity is elusive in the field of hierarchically ordered zeolites. The long-range order is defined by secondary peaks associated with the periodic arrangement of mesopores in x-ray diffraction (XRD) patterns for the given mesophase, and/or by observations in microscopy, as demonstrated in the examples herein. These peaks associated with the mesoporous traits of the products are observed at low $2\theta$ angles. The material also exhibits high-angle peaks associated with the zeolites and are observed at high 2-theta angles. In certain embodiments the low-angle peaks refer to those occurring at $2\theta$ angles less than about 6°

In certain embodiments herein, long-range mesoporous ordering of HOCMMs produced according to the methods described herein are characterized by the mesopore periodicity repeating over a length of greater than about 50 nm.

In certain embodiments herein, HOCMMs having well-defined long-range mesoporous ordering of 3D-cubic symmetry herein possess a surface area of about 200-1500, 200-1000, 200-900, 400-1500, 400-1000, 400-900, 500-1500, 500-1000 or 500-900 m²/g. In embodiments herein, the HOCMMs having well-defined long-range mesoporous ordering of 3D-cubic symmetry herein possess mesoporous pore size of about 2-50, 2-20 or 2-10 nm. In embodiments herein, the HOCMMs having well-defined long-range mesoporous ordering of 3D-cubic symmetry herein possess a silica-to-alumina ratio of about 2.5-1500, 3-1500, 4-1500, 5-1500, 6-1500, 2.5-1000, 3-1000, 4-1000, 5-1000, 6-1000, 2.5-500, 3-500, 4-500, 5-500, 6-500, 2.5-100, 3-100, 4-100, 5-100, or 6-100. In embodiments herein, the HOCMMs having well-defined long-range mesoporous ordering of 3D-cubic symmetry herein possess a total pore volume of about 0.01-1.50, 0.01-1.0, 0.01-0.75, 0.01-0.65, 0.1-1.50, 0.1-1.0, 0.1-0.75, 0.1-0.65, 0.2-1.50, 0.2-1.0, 0.2-0.75, 0.2-0.65, 0.3-1.50, 0.3-1.0, 0.3-0.75 or 0.3-0.65 cc/g.

In embodiments herein, a product produced by the above method and demonstrated in an example herein is characterized by a mesophase having cubic symmetry. In certain embodiments the product is a 3D-cubic ordered mesoporous zeolite. HOCMMs with the mesophase having cubic symmetry are characterized by cubic mesoporous channel directions with CMM micropore channels in the walls of the mesostructure. The cubic mesophase can possess one of Ia-3d, Fm-3m, Pm-3n, Pn-3m or Im-3m symmetry. In embodiments herein the cubic mesophase possesses Ia-3d symmetry and secondary XRD peaks associated with the periodic arrangement of mesopores are present at one or more of the (220), (321), (400), (420) and (332) reflections. In embodiments herein the cubic mesophase possesses Ia-3d symmetry and the high-degree of long-range cubic mesophase ordering is observable by microscopy viewed by the electron beam down a suitable zone axis, for example the [311], or zone axes. In the example herein, nitrate salt ($NO_3^-$) is used as an ionic co-solute is used to generate the mesophase having cubic symmetry. In these embodiments CMM structures are arranged in a cubic symmetry on the meso-scale, where the CMM particles (regardless of their atomic-level symmetry or structure) are arranged around micelles (on the meso-scale), and whereby the micelles are arranged exhibiting cubic symmetry. Accordingly, HOCMM having a cubic mesophase includes CMM characterized by atomic-level symmetry and possessing micropores that are inherent to that type of CMM, arranged in a cubic symmetry at the meso-scale level with mesopores, wherein walls of the mesopores and a mass of the mesostructure between mesopores is characterized by said CMM (e.g., crystalline zeolite). This is created as described herein by forming oligomers of the underlying CMM and arranging those oligomers arranged around micelles exhibiting cubic symmetry on the meso-scale. In one embodiment a HOCMM is provided including MFI zeolite having atomic-level orthorhombic symmetry arranged in a cubic symmetry meso-scale, wherein during synthesis of hierarchically ordered zeolite from parent MFI zeolite, oligomers of the parent MFI zeolite are formed and arranged around micelles exhibiting cubic symmetry on the meso-scale. In one embodiment a HOCMM is provided including CHA zeolite having atomic-level trigonal symmetry arranged in a cubic symmetry meso-scale, wherein during synthesis of hierarchically ordered zeolite from parent CHA zeolite, oligomers of the parent CHA zeolite are formed and arranged around micelles exhibiting cubic symmetry on the meso-scale. In one embodiment a HOCMM is provided including BEA zeolite having atomic-level tetragonal symmetry arranged in a cubic symmetry meso-scale, wherein during synthesis of hierarchically ordered zeolite from parent BEA zeolite, oligomers of the parent BEA zeolite are formed and arranged around micelles exhibiting cubic symmetry on the meso-scale. In one embodiment a HOCMM is provided including MWW zeolite having atomic-level hexagonal symmetry arranged in a cubic symmetry meso-scale, wherein during synthesis of hierarchically ordered zeolite from parent MWW zeolite, oligomers of the parent MWW zeolite are formed and arranged around micelles exhibiting cubic symmetry on the meso-scale. In one embodiment a HOCMM is provided including FAU zeolite having atomic-level cubic symmetry arranged in a cubic symmetry meso-scale, wherein during synthesis of hierarchically ordered zeolite from parent FAU zeolite, oligomers of the parent FAU zeolite are formed and arranged around micelles exhibiting cubic symmetry on the meso-scale.

HOCMMs produced according to the present disclosure are effective as catalysts, or components of catalysts, in hydrocracking of hydrocarbon oil. In certain embodiments, a method for hydrocracking hydrocarbon oil is provided herein, including hydrocracking hydrocarbon oil with a hydrocracking catalyst including hierarchically ordered zeolite produced according to the present disclosure. In certain embodiments, a method for hydrocracking hydrocarbon oil is provided herein, including hydrocracking hydrocarbon oil with a hydrocracking catalyst including hierarchically ordered FAU zeolite produced according to the present disclosure. In certain embodiments, a method for hydrocracking hydrocarbon oil is provided herein, including hydrocracking hydrocarbon oil with a hydrocracking catalyst including hierarchically ordered crystalline microporous material having well-defined long-range mesoporous ordering of cubic symmetry comprising mesopores having walls of crystalline microporous material and a mass of mesostructure between mesopores of crystalline microporous material.

HOCMMs according to the present disclosure are effective as catalysts, or components of catalysts, in hydrocracking of hydrocarbon oil. The HOCMM can be used as a support having loaded thereon one or more active metal components as a hydrocracking catalyst. The active metal components are loaded, for example, carried on surfaces including the mesopore wall surfaces, micropore wall surfaces or mesopore and micropore wall surfaces; the active metal components are loaded according to known methods, such as providing an aqueous solution of the active metal components and subjecting HOCMM as catalyst support material to immersion, incipient wetness, and evaporative, or any other suitable method. In certain embodiments, the CMM of the HOCMM comprises zeolite. In certain embodiments the CMM of the HOCMM comprises one or more zeolite types AEI, *BEA, CHA, FAU, MFI, MOR, LTL, LTA or MWW. In certain embodiments the CMM of the HOCMM comprises FAU zeolite.

The content of the HOCMM and the active metal component are appropriately determined according to the object. In certain embodiments, a hydrocracking catalyst comprises as a support the HOCMM and an inorganic oxide component, typically as a binder and/or granulating agent. For example, support particles (prior to loading of one or more hydrocracking active metal components) can contain HOCMM in the range of about 0.1-99, 0.1-90, 0.1-80, 0.1-70, 0.1-50, 0.1-40, 2-99, 2-90, 2-80, 2-70, 2-50, 2-40, 20-100, 20-90, 20-80, 20-70, 20-50, or 20-40 wt %, with the remaining content being the inorganic oxide. In certain embodiments, support particles (prior to loading of one or more hydrocracking active metal components) can contain HOCMM in the range of about 0.1-99, 0.1-90, 0.1-80, 0.1-70, 0.1-50, 0.1-40, 2-99, 2-90, 2-80, 2-70, 2-50, 2-40, 20-100, 20-90, 20-80, 20-70, 20-50, or 20-40 wt %, with the remaining content being the inorganic oxide and one or more other zeolitic materials.

As the inorganic oxide component, any material used in hydrocracking or other catalyst compositions in the related art can be used. Examples thereof include alumina, silica, titania, silica-alumina, alumina-titania, alumina-zirconia, alumina-boria, phosphorus-alumina, silica-alumina-boria, phosphorus-alumina-boria, phosphorus-alumina-silica, silica-alumina-titania, silica-alumina-zirconia, alumina-zir-conia-titania, phosphorous-alumina-zirconia, alumina-zirconia-titania and phosphorus-alumina-titania.

The active metal component can include one or more metals or metal compounds (oxides or sulfides) known in the art of hydrocracking, including those selected from the Periodic Table of the Elements IUPAC Groups 6, 7, 8, 9 and 10. In certain embodiments the active metal component is one or more of Mo, W, Co or Ni (oxides or sulfides). The additional active metal component may be contained in catalyst in effective concentrations. For example, total active component content in hydrocracking catalysts can be present in an amount as is known in the related art, for example about 0.01-40, 0.1-40, 1-40, 2-40, 5-40, 0.01-30, 0.1-30, 1-30, 2-30, 5-30, 0.01-20, 0.1-20, 1-20, 2-20 or 5-20 W % in terms of metal, oxide or sulfide. In certain embodiments, active metal components are loaded using a solution of oxides, and prior to use, the hydrocracking catalysts are sulfided.

In certain embodiments, a method for hydrocracking hydrocarbon oil using a hydrocracking catalyst described herein including HOCMM as a component comprises introducing a hydrocarbon oil, for instance having a boiling point in the range of about 370-833, 370-816, 370-650, 375-833, 375-816 or 375-650° C., in the presence of hydrogen, to a hydrocracking zone including one or more reactors operating at a reactor temperature in the range of about 300-500, 300-450, 300-420, 350-500, 350-450 or 350-420° C., a hydrogen partial pressure in the range of about 20-100, 20-70, 20-55, 30-100, 30-70, 30-55 or 40-55 bar, a liquid hourly space velocity ("LHSV", which refers to the volumetric flow rate of the liquid feed divided by the volume of the catalyst) in the range of about 0.1-10, 0.2-1.5 h-1, and a hydrogen/oil ratio of in the range of about 500-2,500, 1,000-2,000 normalized cubic meters of hydrogen per cubic meter of oil (Nm³/m³). "Hydrocracking zone" means one or more reactors and associated effluent separation apparatus, and can contain two or more reactors. In certain embodiments, the feed is pre-treated, or is a recycle stream, within the boiling point ranges described above, with sulfur content of less than 100 ppmw or 50 ppmw or 10 ppmw, and nitrogen content of less than 100 ppmw or 50 ppmw or 10 ppmw.

In a method for hydrocracking hydrocarbon oil according to certain embodiments herein, the flow reactor described above can be a flow reactor selected from a stirring bath type reactor, a boiling bed type reactor, a baffle-equipped slurry bath type reactor, a fixed bed type reactor, a rotary tube type reactor and a slurry bed type reactor.

In a method for hydrocracking hydrocarbon oil according to certain embodiments herein, the hydrocarbon oil described above contains preferably heavy hydrocarbon oil obtained from (1) crude oil, (2) synthetic crude oil, (3) bitumen, (4) oil sand, (5) shale oil, (6) coal liquid (7) plastic pyrolysis oils, (8) biomass derived oils or (9) Fisher-Tropsch wax.

In a method for hydrocracking hydrocarbon oil according to certain embodiments herein, the hydrocarbon oil described above contains heavy hydrocarbon oil obtained from crude oil, synthetic crude oil, bitumen, oil sand, shell oil or coal liquid, and the above heavy hydrocarbon oil is preferably any of a) vacuum gas oil (VGO), b) deasphalted oil (DAO) obtained from a solvent deasphalting process or demetallized oil, c) light coker gas oil or heavy coker gas oil obtained from a coker process, d) cycle oil obtained from a fluid catalytic cracking (FCC) process e) gas oil obtained from a visbreaking process, or f) a recycle stream obtained from hydrocracking of one or more of (a)-(e). In a method for hydrocracking hydrocarbon oil according to certain embodiments herein, the hydrocarbon oil comprises a recycle stream obtained from hydrocracking of VGO. In a method for hydrocracking hydrocarbon oil using a hydrocracking catalyst described herein including HOCMM as a component according to certain embodiments herein, the hydrocarbon oil comprises a recycle stream obtained from hydrocracking of VGO, straight run VGO or pre-treated straight run VGO, with selectivity to naphtha and/or middle distillates tailored as a function of the mesophase induced in the HOCMMs described herein to allow operation flexibility. In a method for hydrocracking hydrocarbon oil using a hydrocracking catalyst described herein including HOCMM as a component according to certain embodiments herein, the hydrocarbon oil comprises a recycle stream obtained from hydrocracking of VGO, straight run VGO or pre-treated straight run VGO, with selectivity to naphtha and/or middle distillates tailored as a function of the mesophase induced in the HOCMMs described herein to allow operation flexibility.

In a method for hydrocracking hydrocarbon oil using a hydrocracking catalyst described herein including HOCMM as a component according to certain embodiments herein, the hydrocarbon oil comprises a recycle stream obtained from hydrocracking of VGO, straight run VGO or pre-treated straight run VGO, with selectivity to naphtha and middle distillates tailored as a function of the cubic symmetry mesophase induced in the HOCMMs described herein to allow operation flexibility.

EXAMPLES

The HOCMMs produced in the examples herein exhibit a remarkable degree of well-defined long-range mesoporous ordering, as given by the low-angle XRD patterns. The parent zeolite used in the examples and comparative examples possesses the FAU framework, zeolite Y (obtained from Zeolyst International, product name CBV 720) and is referred to herein as zeolite HY-15, having a $SiO_2/Al_2O_3$ (SAR) of about 30 (Si/Al atomic ratio of 15). While the examples are shown with respect to this particular zeolite, the methods herein can be applied to a parent CMM from another source and of another type as described herein, whether obtained from a commercial manufacturer or from a separate synthesis process. Accordingly, the resulting composition of matter has the mesoporous structure with microporosity and CMM structure corresponding to the parent CMM. The solutions were prepared at room temperature (RT) and under stirring at 500 RPM.

Characterizations herein were carried out as follows. Powder x-ray diffraction patterns were obtained using a Bruker D8 twin diffractometer, operating at 40 kV and 40 mA having Cu Ka radiation ($\lambda$=0.154 nm) and a step-size of 0.02°. $N_2$ physisorption measurements were conducted at 77 K using a Micromeritics ASAP 2420 instrument. All samples were degassed at 350° C. for 12 h before the analysis. The specific surface areas and pore size distributions were calculated using the Brunauer-Emmett-Teller (BET) and non-local density functional theory (NLDFT) models. The t-plot method was used to calculate the micropore volume. High-resolution transmission electron microscopy (TEM) studies were undertaken using a FEI-Titan ST electron microscope operated at 300 kV. Scanning electron microscopy (SEM) images were obtained with Nova Nano HR-SEM 240 microscope operated at 4 kV. The samples were sputter-coated with Platinum (Pt) prior to the analysis to eliminate the charge effect. The Si/Al ratios were calculated by solid-state magic-angle spinning nuclear magnetic resonance (MAS-NMR) experiments using a Bruker Advance 400 MHz instrument, applying 4 µs radio frequency pulses and a recycle delay of 60 s. Conversely, the bulk Si/Al ratios of the zeolites were calculated from the inductively coupled plasma-optical emission spectroscopy (ICP-OES) analysis performed using 5100 ICP-OES Agilent instruments. Prior to the analysis, the samples were mixed with hydrofluoric acid (HF) and nitric acid ($HNO_3$) and digested at 260° C. and 160 bar using an UltraWAVE microwave digestion system (Milestone).

For the acquisition of the electron micrographs for tomography reconstruction, the zeolite powder was deposited on a Quantifoil 300 mesh TEM grid supporting a 2 nm thick continuous carbon film over a holey carbon membrane. Prior to the zeolite deposition, a diluted solution of gold nanoparticles (AuNPs) around 5 nm in diameter was dispersed on the TEM grid. The AuNPs will be used in the alignment of the tomographic tilt series. To protect the specimen from beam-induced damage during the long exposure time needed for tomography data acquisition, the acquisition of the tomographic tilt series was performed at liquid nitrogen temperature on a Krios G4 (ThemoFisher™) electron microscope. The real temperature at the stage level was around −183° C. The tilt series was acquired in energy-filtered (EF) mode using a 30 eV slit for increasing the contrast of bright field TEM images. The detection was done on the Falcon i electron direct detector camera run in electron counting mode with 4096-pixel frame size. To keep the total exposure dose low, only the sample tracking was performed after each tilt series during data acquisition. The re-focusing was performed manually around every 10 images. The angular range was +64° with a tilt step of 1°. The tilt series were aligned in the IMOD software using 13 AuNPs as fiducial markers that were clearly visible at each tilting angle. Prior to the reconstruction an image binning of 2 was performed to increase the SNR and reduce the computation time. To enhance the visibility of the pores in the 3D tomograph the images were filtered using an average background subtraction filter (ABSF) implemented as a script in Digital Micrograph. The SIRT reconstruction algorithm run with 100 iterations and a relaxation coefficient of 1 was employed.

Coke quantification was done from thermogravimetric-temperature programmed oxidation equipped with a mass spectrometer (TG-TPO/MS) using a Mettler-Toledo TGA instrument. Before combustion, the catalyst sample was heated under $N_2$ stream (50 mL min$^{-1}$) up to 350° C. for 0.5 h using a ramp rate of 10° C. min$^{-1}$. After cooling down to 100° C., coke combustion was carried out up to 850° C. in air with a ramp rate of 5° C. min$^{-1}$. Alongside, OmniStar™ mass spectrometer (MS) was used to analyze the $CO_2$ (m/z=44) profiles from combustion.

Example 1A: A quantity of 0.6 grams of urea was added to 28.3 grams of water to form a homogeneous solution. To this solution, a quantity of 1.0 grams of dried zeolite HY-15 was dispersed and further stirred for 0.5 hours. Subsequently, 20 milliliters of water and 1.5 milliliters of DOAC (42.0 wt % in methanol) were added and further stirred for 2 hours. The resultant solution was subjected to hydrothermal treatment at 130° C. for 5 days. The resulting solids were filtered, washed with water, and dried at 120° C. for 24 hours. The synthesized products were calcined in air at 550° C. for 6.0 hours at a ramp rate of 60° C./hour to yield U-TMS (where U refers to urea). The U-TMS formed in accordance this procedure exhibits poorly defined mesoporosity, and is characterized in FIGS. 3A-4B and textural properties provided in Table 3.

In an alternative procedure, a quantity of 1.2 grams of urea was dissolved in 60.0 grams of water to form a homogeneous solution. To this mixture, 2.0 grams of dried zeolite HY-15 was added and stirred for 10 minutes. Subsequently, 3.0 milliliters of DOAC (42.0 wt % in methanol) was added. The resulting solution was stirred for 0.5 hours, followed by hydrothermal treatment at 130° C. for 72 hours. The resulting mixture was filtered, washed with water and dried at 120° C. for 24 hours. The synthesized product was calcined in air at 550° C. for 6 hours with a ramp rate of 60° C./hour to yield U-TMS, which did not possess defined mesoporosity.

Example 1B: A procedure for synthesis of 3D-cubic ordered mesoporous FAU-type zeolites is provided. A quantity of 0.6 grams of urea was added to 10.0 grams of water to form a homogeneous solution. To this solution, a quantity of 1.0 grams of dried zeolite HY-15 was added and stirred for 0.5 hours. Subsequently, 20 milliliters of water, 0.1 grams of ammonium nitrate ($NH_4NO_3$) as a source of ionic co-solute and 1.5 milliliters of DOAC (42.0 wt % in methanol) were added stepwise and the mixture further stirred for 2 hours. The resultant solution was subjected to hydrothermal treatment at 130° C. for 5 days. The resulting solids were filtered, washed with water, and dried at 120° C. for 24 hours. The synthesized products were calcined in air at 550° C. for 6.0 hours at a ramp rate of 60° C./hour to yield U-N-TMS-130 (where N refers to nitrate and "130" refers to the hydrothermal treatment temperature). The U-N-TMS-130 formed in accordance with this procedure exhibits 3D-cubic ordered mesoporous symmetry, and is characterized in FIGS. 3A-4B, with a TEM image presented in FIG. 5 and structural and textural properties provided in Table 3.

In an alternative procedure, a quantity of 1.2 grams of urea was dissolved in 60.0 grams of water to form a homogeneous solution. To this mixture, 0.2 grams of ammonium nitrate ($NH_4NO_3$) was added as a source of ionic co-solute, and stirred to form a homogeneous solution. 2.0 grams of dried zeolite HY-15 was added and stirred for 10 minutes. Subsequently, 3.0 milliliters of DOAC (42.0 wt % in methanol) was added. The resulting solution was stirred for 0.5 hours, followed by hydrothermal treatment at 130° C. for 72 hours. The resulting solids were filtered, washed with water and dried at 120° C. for 24 hours. The synthesized product was calcined in air at 550° C. for 6 hours with a ramp rate of 60° C./hour to yield U-N-TMS. The calcined U-N-TMS formed in accordance with this procedure exhibits 3D-cubic ordered mesoporous symmetry as is apparent in the TEM images presented in FIGS. 6A-6B.

Example 1C: A procedure similar to that identified herein in the first procedure of Example 1B was followed, except that 1.0 grams of urea and 2.0 milliliters of DOAC (42.0 wt % in methanol) were used, and hydrothermal treatment was carried out at 150° C. for 72 hours. The calcined product is U-N-TMS-150 that possessed 3D-cubic ordered mesoporous symmetry. The U-N-TMS-150 from this procedure is characterized in FIGS. 3A-4B, and its TEM images are presented in FIG. 8 and structural and textural properties provided in Table 3.

Figures 3A, 3B:
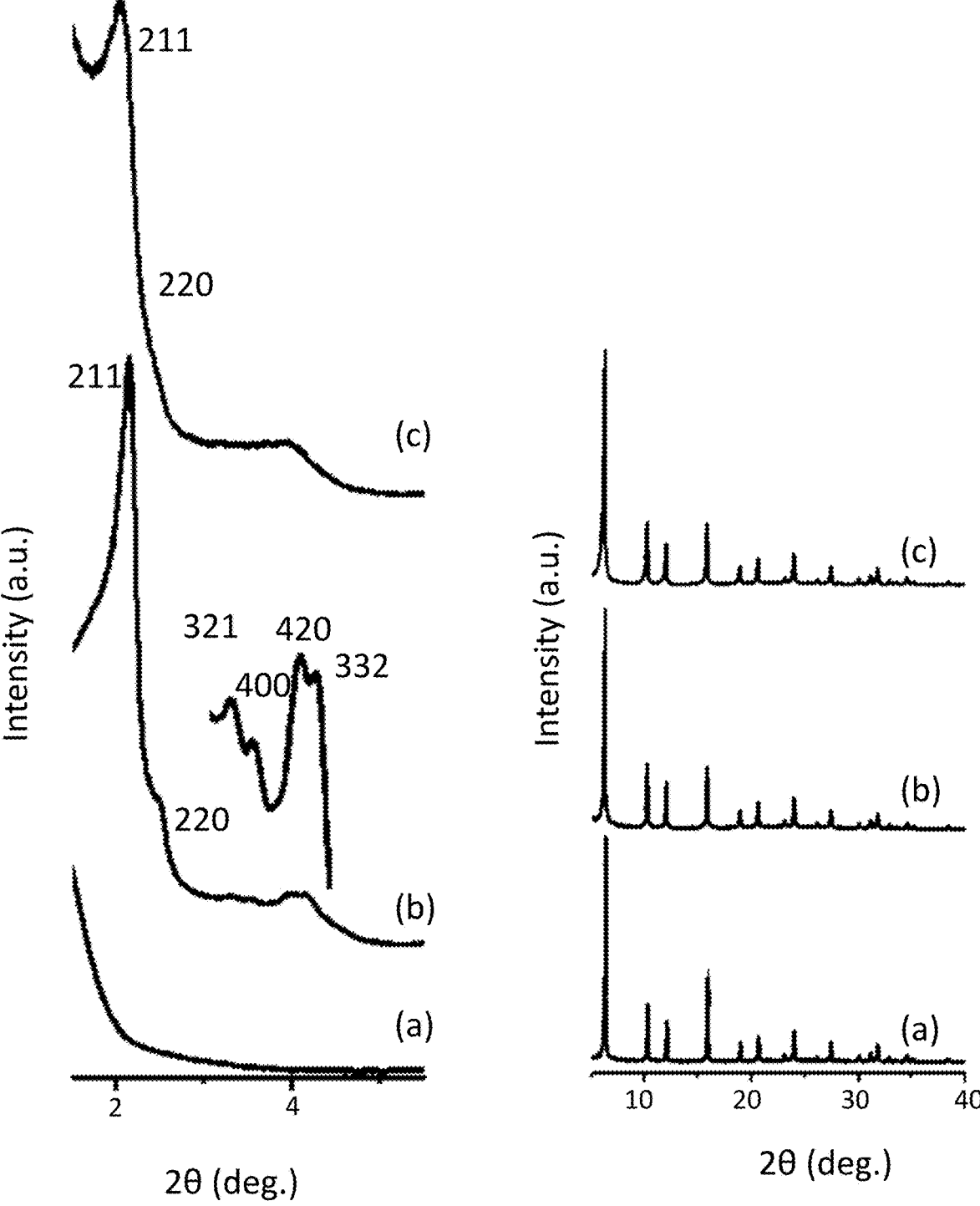
FIGS. 3A-3B depict low-angle and high-angle XRD patterns.
Figures 4A, 4B:
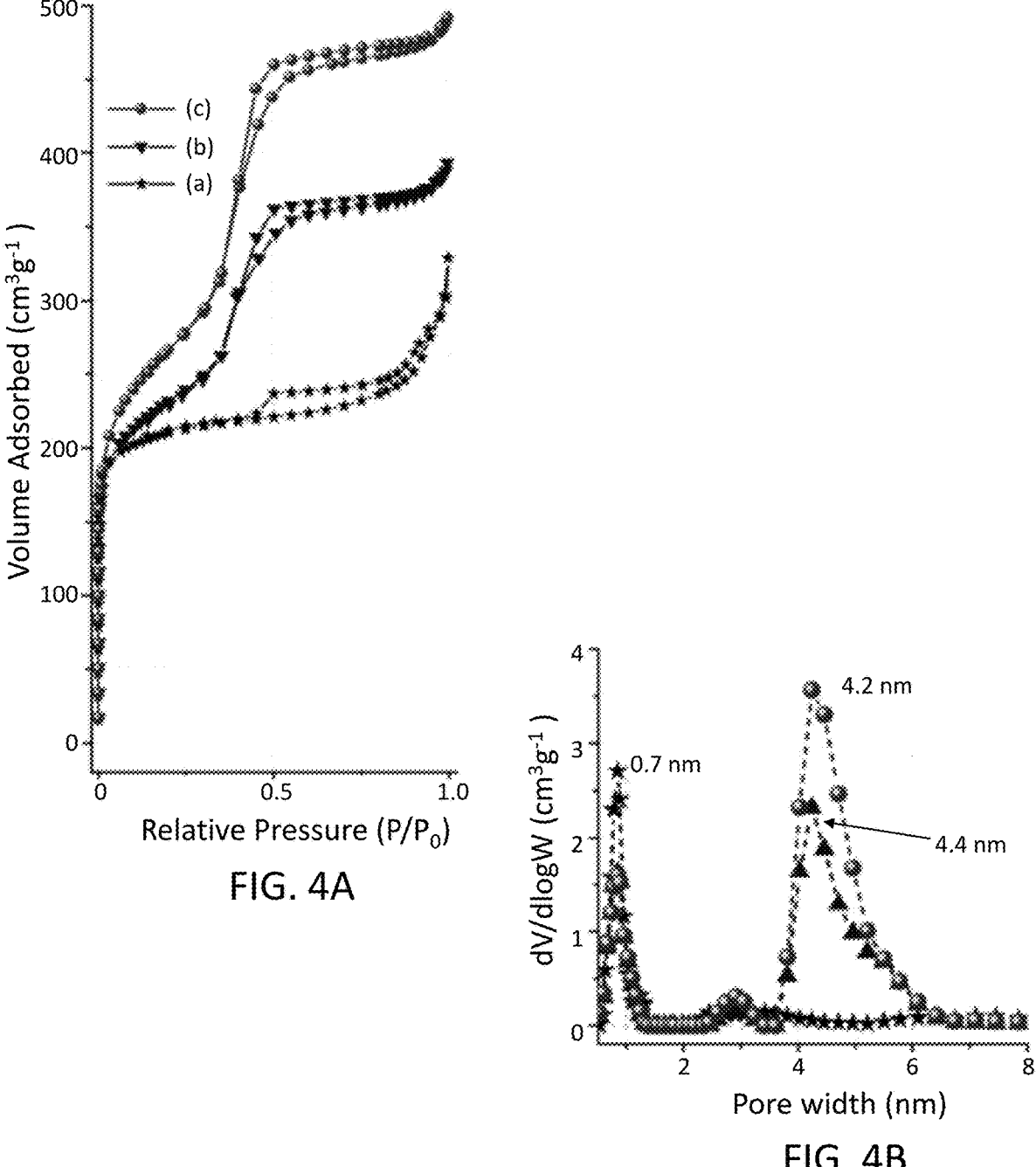
FIG. 4A depicts $N_2$ physisorption isotherms.
FIG. 4B depicts DFT pore-size distributions, of parent zeolite and synthesized materials from Examples 1B-C.

When comparing the Example 1A to Examples 1B and 1C, the benefit of the ionic co-solute contribution of the nitrate is apparent. The ionic co-solute serves to influence the cubic micelle shape by the Hofmeister effect, around with the FAU-type zeolite oligomers are arranged. FIG. 3A depicts low-angle XRD patterns, FIG. 3B depicts high-angle XRD patterns, FIG. 4A depicts $N_2$ physisorption isotherms and FIG. 4B depicts DFT pore-size distributions, wherein "a" corresponds to commercial-USY (Zeolite HY-15), "b"

corresponds to U-N-TMS-130, and "c" corresponds to U-N-TMS-150. In the Example 1A there is a degree of periodicity of mesopore arrangement possibly from either a bimodal system or a structure collapse, however, there is a significant lack of any long-range ordering as compared with the Example 1B having the nitrate anion where, in FIG. 3A, it is observed by low angle XRD showing reflections characteristic of gyrodial bicontinuous (cubic) mesopore structure (Ia-3d). In the Example 1B, the product hierarchically ordered zeolite is a 3D-cubic ordered mesoporous FAU-type zeolite, having cubic mesoporous channels present in the and directions with FAU micropore channels in the walls and mass of the mesostructure between mesopores.

Figure 5C:
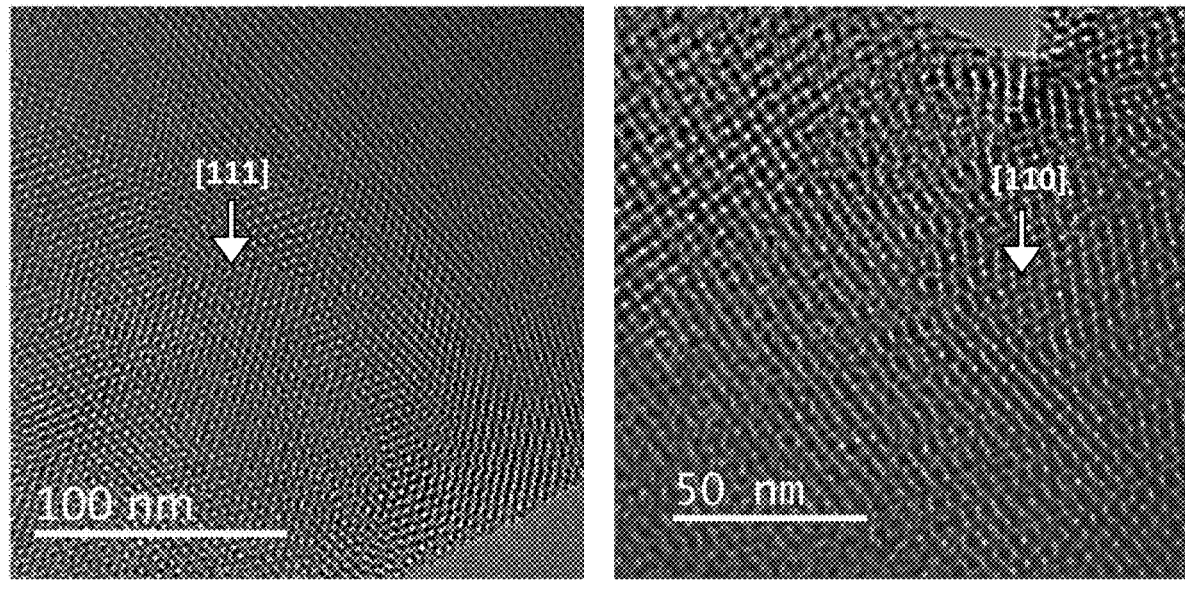
Figure 5C:
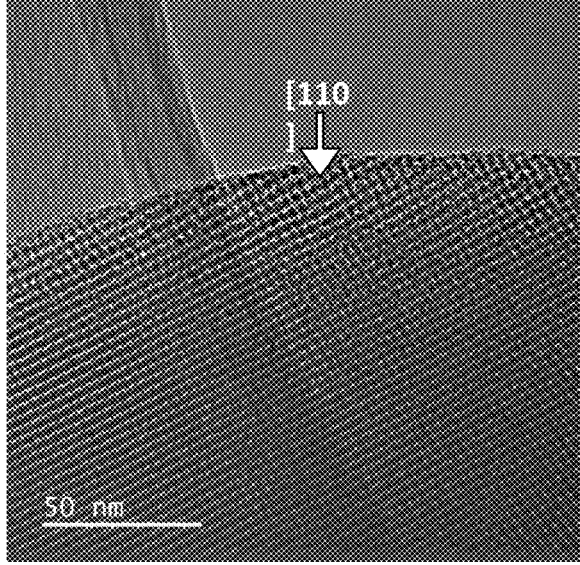
Figure 6A:
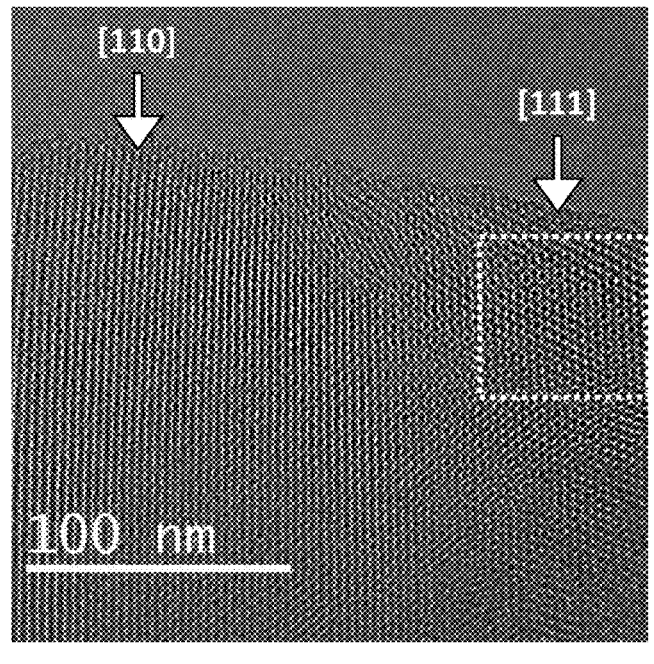
FIGS. 6A-6B depict TEM micrographs of hierarchically ordered zeolite synthesized in Example 1B.
Figure 6B:
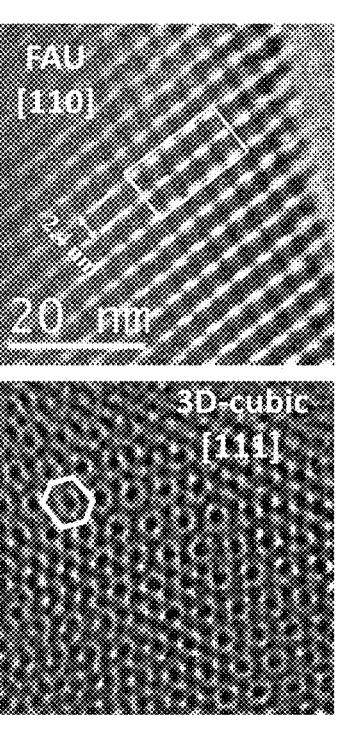
Figure 6C:
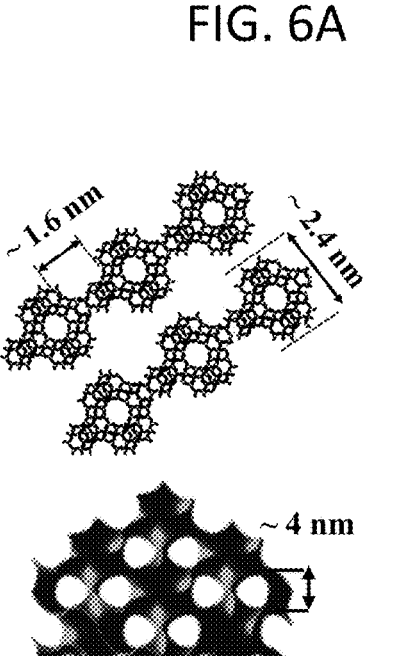
FIG. 6C depicts unit cell schematic and dimensions for FAU-type zeolite framework (top) and 3D-cubic mesostructure (down).
Figure 7:
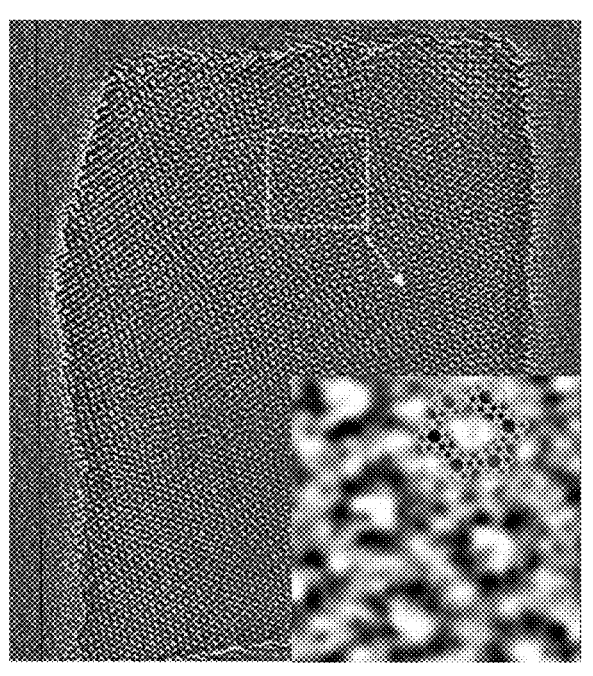
FIG. 7 depicts electron tomography reconstruction of hierarchically ordered zeolite synthesized in Example 1C.

FIG. 5 presents TEM micrographs of calcined U-N-TMS-130 formed according to the first procedure of Example 1B, showing cubic mesoporous channels in the and directions, wherein image (A) is at a scale of 100 nanometers, and images (B) and (C) are at a scale of 50 nanometers. FIGS. 6A-B are TEM micrographs of calcined U-N-TMS formed according to the second procedure of Example 1B showing cubic mesoporous channels in the and directions, wherein: FIG. 6A shows the TEM micrograph at a scale of 100 nanometers; FIG. 6B shows the TEM micrograph in the direction and in the direction at a scale of 20 nanometers; and FIG. 6C depicts a FAU unit cell schematic and dimensions and their arrangement to provide long-range mesoporous ordering. The high-degree of long-range ordering is apparent from the low-angle XRD patterns of FIG. 3A, exhibiting Bragg's reflections 211, 220, 321, 400, 420 and 332, which are characteristic of bicontinuous gyroid (cubic) (Ia-3d) mesopore symmetry (where the reflections at 321, 400, 420 and bare magnified). The retention of the underlying zeolite structure is apparent from the high-angle XRD patterns of FIG. 3B, which are consistent with those for the parent zeolite, FAU zeolite. In addition, the U-N-TMS-130 and U-N-TMS-150 demonstrate excellent hierarchically ordered mesoporosity as indicated by characteristic type-IV isotherm with H1 hysteresis depicted in the $N_2$ physisorption isotherms of FIG. 4A. Further, a high mesopore volume and narrow pore-size distribution demonstrated in FIG. 4B further supports the presence of long-range ordered mesoporosity. FIG. 7 presents an electron tomography reconstruction of U-N-TMS-150 with an inset to magnify the pore architecture and show an overlay diagram of the structure. FIG. 8 presents TEM micrographs of U-N-TMS-150 with corresponding structural diagrams, with image (A) showing TEM micrograph at a scale of 20 nanometers in the orientation, image (B) showing a scale of 50 nanometers in the orientation and image (C) showing a scale of 10 nanometers in the orientation, with insets in (A) and (B) showing magnified images and the inset in (C) showing selected area electron diffraction (SAED). The U-N-TMS-150 synthesized at a higher temperature demonstrated improved textural properties as a result of the thorough removal of non-framework aluminum. The 3D mesostructure by electron tomography (ET) revealed a homogenous distribution of mesoporous channels inside the zeolite volume. A longitudinal slice cut through the middle of the zeolite grain shows a continuous network of mesopores developed along a single crystallographic direction. The inset in FIG. 7 highlights the 3D spatial homogeneity of the hierarchical pore architecture. The interconnected mesopore network formed by the zeolite framework extends from the zeolite grain external facets to its core.

According to the examples herein, a hierarchically ordered FAU-type framework exhibiting 3D-cubic (Ia-3d)

mesopore symmetry is prepared for the first time by a methodical post-synthetic reassembly.

Example 2: The catalytic properties of the U-N-TMS-150 3D-cubic ordered mesoporous FAU-type zeolite were evaluated for the low-pressure hydrocracking of a recycle stream (2nd stage feedstock) from a two-stage hydrocracking unit using a fixed-bed reactor. The feedstock is a pretreated straight-run vacuum gas oil from a first stage hydrocracking unit, and therefore contains very low levels of sulfur and nitrogen, 40 ppmw and 17 ppmw, respectively. The composition and properties of the feedstock are tabulated in Table 4. The catalysts were prepared by mixing the mesoporous FAU-type zeolite (30 wt %) with alumina (70 wt %), followed by incipient wet-impregnation of nickel (Ni) and molybdenum (Mo) species. In particular, 70 wt % alumina was dispersed in a minimum amount of deionized (DI) water. To this slurry, 30 wt % zeolite was added slowly and stirred for 15 min. In the next step, the desired amounts of $(NH_4)_6Mo_7O_{24} \cdot 4H_2O$ (8.5 wt % Mo), $Ni(NO_3)_2 \cdot 6H_2O$ (3.0 wt % Ni) and citric acid (7.5 wt %) were added to the slurry of zeolite-alumina and stirred for another 1 h. The thus obtained mixture was dried at 120° C. overnight, followed by calcination at 550° C. for 4 h. The obtained metal oxide loaded catalysts in powder form were sulfided in a batch reactor (Parr) at 300° C. and 50 bars for 4 h using dimethyldisulfide (1 mL $g^{-1}$ of catalyst) as a sulfiding agent in the presence of hydrogen at 40 bars. The catalyst bed was prepared by packing 0.5 g of sulfide catalyst between two silicon carbide (46 mesh) layers each (16 ml in volume) in a stainless steel cylindrical reactor (SS316; internal diameter—9.1 mm; length—300 mm) with a 20 μm porous plate located at the bottom. The loaded catalyst was purged with a $H_2/N_2$ (75:25 volume ratio) gas mixture at a flow rate of 100 ml/h at 450° C. and 50 bars for 2 h to remove any moisture. The catalytic studies were performed at 400° C. temperature and 50 bars pressure with the H2/ oil ratio of 750 $Nm^3/m^3$ and weight hour space velocity (WHSV) of 1 $h^{-1}$. The reaction was performed for 10 h, and the liquids were separated from the liquid-gas separator and collected periodically after every hour for gas chromatography (GC) analysis. The liquid products were analyzed according to the ASTM D2887 standard test method using Agilent 6980N GC coupled with simulated distillation (SIMDIS) software.

Conversion (X) of the feed, selectivity(S) and yield (Y) to the desired hydrocarbon mixtures, naphtha (C4-150° C.), kerosene (150-250° C.), and gas oil (250-370° C.) were calculated from boiling point distribution curves obtained by SIMDIS analysis based on the literature according to equations (1), (2) and (3), respectively:

$$X = \left( \frac{R.W._{Feed}^{370+} - R.W._{Product}^{370+}}{R.W._{Feed}^{370+}} \right) \times 100 \qquad (1)$$

where $$R.W._{Feed}^{370+} \text{ and } R.W._{Product}^{370+}$$

correspond to the remaining fraction of material (wt. %) in the feed and product at a boiling point ≥370° C.

$$S_{x-y} = \left( \frac{R.W._{Product}^{x-y} - R.W._{Feed}^{x-y}}{R.W._{Feed}^{370+} - R.W._{Product}^{370+}} \right) \times 100 \qquad (2)$$

-continued
$$Y_{x-y} = \left( \frac{R.W._{Product}^{x-y} - R.W._{Feed}^{x-y}}{R.W._{Feed}^{370+}} \right) \times 100 \qquad (3)$$

where $$R.W._{Product}^{x-y} \text{ and } R.W._{Feed}^{x-y}$$

correspond to the fraction of material (wt. %) in the product and the feed between the boiling points 'x and y'. $S_{x-y}$ and $Y_{x-y}$ correspond to selectivity and yield of the hydrocarbon fractions between boiling points 'x and y'. Conversion per acid site was calculated by dividing the obtained conversion by the total number of acid sites, which were quantified by pyridine FTIR spectroscopy at 150° C.

Figures 9, 10:
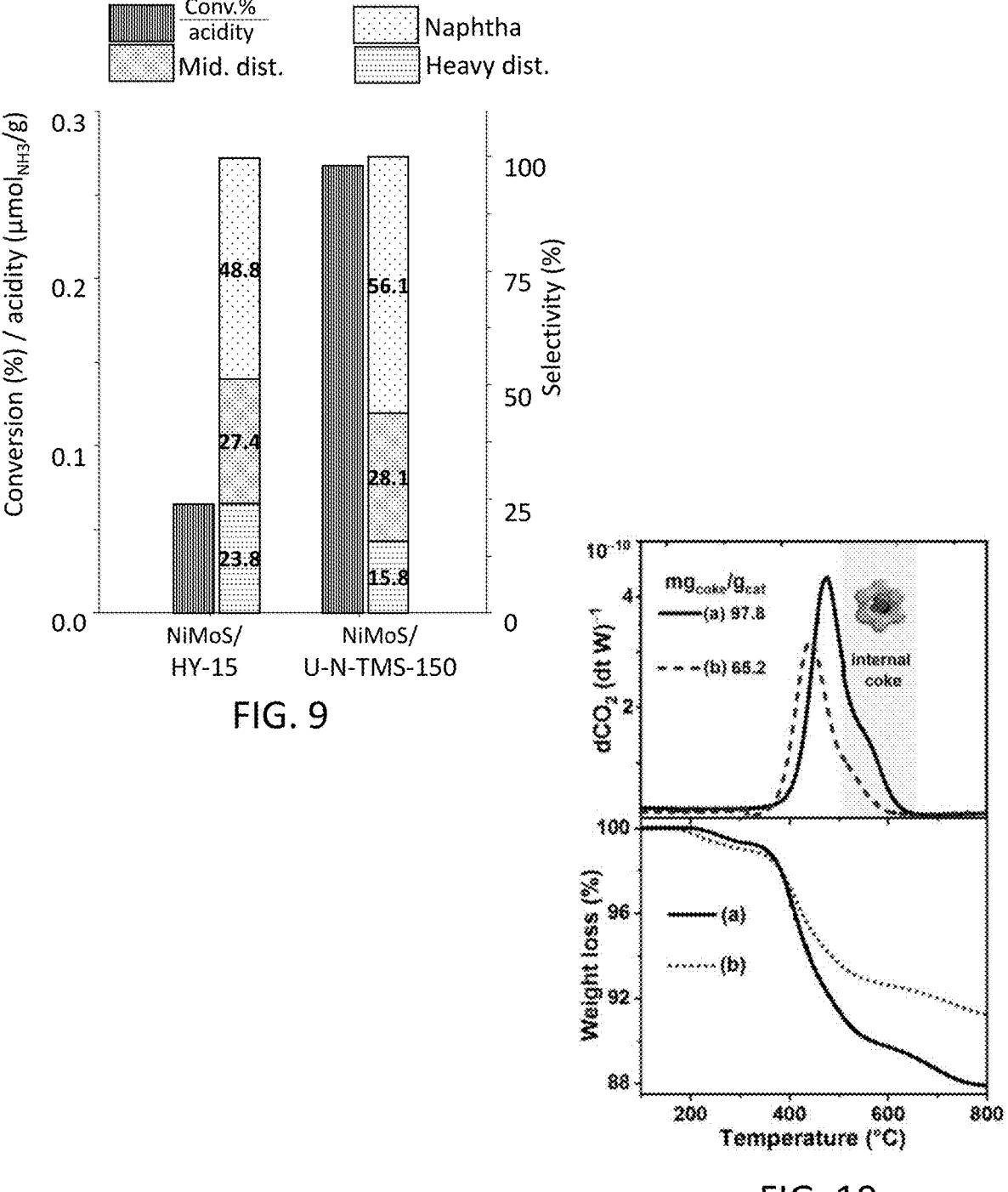
FIG. 9 is a plot of hydrocracking activity (conversion percentage per acid site) and selectivity (naphtha, middle distillates and heavy distillates) of synthesized materials in examples herein, and a parent zeolite.
FIG. 10 depicts $CO_2$ profiles from coke combustion and thermal gravimetric analysis of spent samples of synthesized materials in examples herein, and a parent zeolite.

Table 5 shows acid properties of the parent zeolite and the synthesized Y-U-N-TMS, and catalytic performance. Despite having a lower concentration of zeolitic acid sites compared with the parent zeolite, the HOCMM synthesized herein demonstrates excellent catalytic performance. FIG. 9 is a plot of hydrocracking activity (conversion percentage per acid site) and selectivity (naphtha, middle distillates and heavy distillates) of the catalysts formed using the parent zeolite and the HOCMM, U-N-TMS, described herein. The HOCMM synthesized herein demonstrates higher conversion and naphtha selectivity compared with the parent zeolite.

Tailoring of the mesophase symmetry, and the associated physicochemical properties that are induced by realizing cubic symmetry mesophase, resulted in increased product selectivity, namely higher naphtha and middle distillate yields.

Investigation of the nature of coke is also employed to determine catalytic stability and longevity. In this regard, the nature of coke on the spent catalysts was quantified from $CO_2$ profiles resulting from combustion using temperature-programmed oxidation. FIG. 10 depicts $CO_2$ profiles from coke combustion (A) and temperature programmed oxidation of spent catalysts (B), wherein pattern (a) represents parent zeolite and pattern (b) represents the hexagonal HOCMM herein. The catalysts have shown two major peaks in the regions 320-500° C. and 500-640° C. corresponding to external coke present in the mesopores and internal coke (zeolitic micropores), respectively. While not wishing to be bound by theory, internal coke is expected to be a reason for zeolite deactivation due to its restricted combustion during regeneration, particularly under the low-pressure cracking conditions which tend to form high internal cokes as a result of a low H/C ratio and poor accessibility to $O_2$, and in this regard, the HOCMM herein, due to its enhanced diffusion properties, have shown low internal coke deposition (15-20%) compared with the parent (35%) zeolite. In commercial hydrocracking, the zeolite component of a catalyst is critical in offering the refinery flexibility in its mode of operation, i.e., to be middle-distillate or naphtha selective, and the HOCMMs herein can be used to allow refineries to operate under different modes of operation.

The improved naphtha selectivity indicates improved accessibility to acid sites, secondary cracking of middle-distillate hydrocarbons to naphtha hydrocarbons likely occurs. The synthesized U-N-TMS possess a high B/L acid site ratio and 3D-mesostructure, demonstrates excellent conversion of the VGO feedstock, and good selectivity to naphtha and middle distillates.

As used herein, the phrase "a major portion" with respect to a particular composition and/or solution and/or other parameter means at least about 50% and up to 100% of a unit or quantity. As used herein, the phrase "a significant portion" with respect to a particular composition and/or solution and/or other parameter means at least about 75% and up to 100% of a unit or quantity. As used herein, the phrase "a substantial portion" with respect to a particular composition and/or solution and/or other parameter means at least about 90, 95, 98 or 99% and up to 100% of a unit or quantity. As used herein, the phrase "a minor portion" with respect to a particular composition and/or solution and/or other parameter means at least about 1, 2, 4 or 10%, up to about 20, 30, 40 or 50% of a unit or quantity.

It is to be understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

TABLE 1

| Crystal systems. | | |
|---|---|---|
| System | Unit cell | Essential symmetry of crystal |
| Triclinic | No special relationship | None |
| Monoclinic | $a \neq b \neq c$ $\alpha = \gamma = 90° \neq \beta$ | Two-fold axis or mirror plane (inverse two-fold axis) |
| Orthorhombic | $a \neq b \neq c$ $\alpha = \beta = \gamma = 90°$ | Three orthogonal two-fold or inverse two-fold axes |
| Tetragonal | $a = b \neq c$ $\alpha = \beta = \gamma = 90°$ | One four-fold or inverse four-fold axis |
| Trigonal | $a = b = c$ $\alpha = \beta = \gamma \neq 90°$ | One three-fold axis or inverse three-fold axis |
| Hexagonal | $a = b \neq c$ $\alpha = \beta = 90°, \gamma = 120°$ | One six-fold or inverse six-fold axis |
| Cubic | $a = b = c$ | Four three-fold axes |

TABLE 2

| Crystal classes | | |
|---|---|---|
| | Crystal classes (point group) | |
| System | Non-centrosymmetric | Centrosymmetric |
| Triclinic | 1 | $\bar{1}$ |
| Monoclinic | 2, m $(=\bar{2})$ | 2/m |
| Orthorhombic | 222, 2 mm | mmm |
| Tetragonal | 4, $\bar{4}$ | 4/m |
| | 422, 4 mm, $\bar{4}2$ m | 4/mmm |
| Trigonal | 3 | $\bar{3}$ |
| | 32, 3 m | $\bar{3}$ m |
| Hexagonal | 6, $\bar{6}$ | 6/m |
| | 622, 6 mm, $\bar{6}2$ m | 6/mmm |
| Cubic | 23 | $m\bar{3}$ |
| | 432, $\bar{4}3$ m | $m\bar{3}m$ |

TABLE 3

| | $a_0{}^\Phi$ | | $S_{BET}$ (m$^2$ g$^{-1}$)$^a$ | | D | $V_p$ (cm$^3$ g$^{-1}$)$^d$ | | $V_p$ – |
|---|---|---|---|---|---|---|---|---|
| | Micro | Meso | | | | | | |
| Sample | (Å)$^\varepsilon$ | (nm) | Micro$^b$ | Total | (nm)$^c$ | Micro$^b$ | Total | Meso(%)$^e$ |
| U-N-TMS-150 | 24.39 | 10.1$^\varepsilon$ | 374 | 964 | 4.4 | 0.15 | 0.75 | 80.0 |
| U-N-TMS-130 | 24.36 | 10.1$^\varepsilon$ | 430 | 846 | 4.2 | 0.18 | 0.59 | 69.4 |
| HY-15 | 24.28 | — | 640 | 811 | — | 0.25 | 0.44 | 43.2 |
| U-TMS | 24.21 | — | 417 | 874 | — | 0.21 | 0.41 | 48.8 |

$^a$Brunauer-Emmett-Teller (BET) surface area;
$^b$calculated using the t-plot method;
$^c$ mesopore size;
$^d$ pore volume;
$^d$ pore volume;
$^e$percentage of mesopore volume.
$^\Phi$Unit-cell parameters calculated by formulae - $^\varepsilon$a = d√(h$^2$ + k$^2$ + l$^2$).

TABLE 4

Composition and properties of feedstock

| | |
|---|---|
| Density at15° C., g/cm$^3$ | 0.8391 |
| Sulfur, ppmw | 40 |
| Nitrogen, ppmw | 17 |
| Initial boiling point, ° C. | 291 |
| 5/10 wt %, ° C. | 353/374 |
| 30/50 wt %, ° C. | 414/441 |
| 70/90 wt %, ° C. | 467/503 |
| 95 wt %, ° C. | 521 |
| Final boiling point, ° C. | 568 |

TABLE 5

Acid properties and catalytic activities*

| Zeolite | BAS$^\S$ | LAS$^\yen$ | Total | B/L$^\P$ | $X_{VGO}$ (%)$^\varepsilon$ | Y (%)$^£$ | | | Coke$^\Phi$ (mg$_{coke}$/g$_{cat}$) |
|---|---|---|---|---|---|---|---|---|---|
| | | | | | | Naphtha | Mid. Dist. | Gas oil | |
| U-N-TMS-150 | 0.13 | 0.07 | 0.20 | 1.7 | 54.6 | 30.6 | 15.3 | 8.7 | 65.2 |
| HY-15 | 0.28 | 0.44 | 0.72 | 0.6 | 46.8 | 22.8 | 12.8 | 11.1 | 97.8 |

*from pyridine FT-IR recorded at 150° C.;
$^\S$Brønsted acid sites;
$^\yen$Lewis acid sites;
$^\P$Brønsted/Lewis acid ratio;
$^\varepsilon$Conversion;
$^£$Yield.
Acidity units are millimoles of adsorbate per gram of zeolite (μmol$_{NH3}$/g);
$^\Phi$From $CO_2$ profiles of TPO-MS.

3. The composition of matter as in claim 1, wherein the cubic mesophase possess Ia-3d symmetry and secondary peaks in XRD are present at one or more of (220), (321), (400), (420) or (332) reflections.

4. The composition of matter as in claim 1, wherein the cubic mesophase possess Ia-3d symmetry and long-range ordering is observable by microscopy viewing an electron beam down a [311], [111] or [110] zone axis.

5. The composition of matter as in claim 1, wherein the cubic mesophase possess Fm-3m symmetry and long-range ordering is observable by microscopy viewing an electron beam down a [001] or [110] zone axis.

What is claimed is:

1. A composition of matter comprising hierarchically ordered crystalline microporous material having well-defined long-range mesoporous ordering of cubic symmetry comprising mesopores having walls of crystalline microporous material and a mass of mesostructure between mesopores of crystalline microporous material, wherein the long-range ordering of cubic mesophase symmetry is defined by presence of secondary peaks in an X-ray diffraction (XRD) pattern including peaks occurring at 20 angles less than about 6° and is observable by microscopy including mesopore periodicity repeating over a length of greater than 50 nm.

2. The composition of matter as in claim 1, wherein the cubic mesophase possess Ia-3d, Fm-3m, Pm-3n, Pn-3m or Im-3m symmetry.

6. The composition of matter as in claim 1, wherein said crystalline microporous material comprises a zeolite, or a zeolite-type material selected from the group consisting of aluminophosphates, silicon-substituted aluminophosphates, metal-containing aluminophosphates and zeolitic siliceous only framework material.

7. The composition of matter as in claim 1, wherein said crystalline microporous material is a zeolite having a framework selected from the group consisting of AEI, *BEA, CHA, FAU, MFI, MOR, LTL, LTA and MWW.

8. The composition of matter as in claim 1, wherein said parent crystalline microporous material is a zeolite having FAU framework.

9. A hydrocracking catalyst comprising the hierarchically ordered crystalline microporous material as in claim 6, an inorganic oxide component as a binder, and an active metal component comprising one or more metals selected from the Periodic Table of the Elements IUPAC Groups 6, 7, 8, 9 or 10.

10. The hydrocracking catalyst as in claim 9, wherein the hierarchically ordered crystalline microporous material comprises about 0.1-99 wt % of the hydrocracking catalyst.

11. The hydrocracking catalyst as in claim 10, wherein the inorganic oxide component is selected from the group consisting of alumina, silica, titania, silica-alumina, alumina-titania, alumina-zirconia, alumina-boria, phosphorus-alumina, silica-alumina-boria, phosphorus-alumina-boria, phosphorus-alumina-silica, silica-alumina-titania, silica-alumina-zirconia, alumina-zirconia-titania, phosphorous-alumina-zirconia, alumina-zirconia-titania and phosphorus-alumina-titania.

12. The hydrocracking catalyst as in claim 10, wherein the inorganic oxide component comprises alumina.

13. The hydrocracking catalyst comprising the hierarchically ordered crystalline microporous material as in claim 9, wherein the hierarchically ordered crystalline microporous material comprises about 20-50 wt % of the hydrocracking catalyst and the inorganic oxide component comprises alumina.

14. The hydrocracking catalyst as in claim 13, wherein the active metal component comprises one or more of Mo, W, Co or Ni (oxides or sulfides).

15. A method for hydrocracking hydrocarbon oil, comprising: hydrocracking hydrocarbon oil with a hydrocracking catalyst as in claim 14.

16. The method as in claim 15, wherein the hydrocarbon oil comprises a recycle stream obtained from hydrocracking of VGO, straight run VGO or pre-treated straight run VGO, with selectivity to naphtha and middle distillates tailored as a function of the cubic symmetry mesophase.

17. A method for hydrocracking hydrocarbon oil, comprising: hydrocracking hydrocarbon oil with a hydrocracking catalyst as in claim 9.

18. The hydrocracking catalyst as in claim 9, wherein the hierarchically ordered crystalline microporous material comprises about 20-50 wt % of the hydrocracking catalyst.

19. The hydrocracking catalyst as in claim 18, wherein the active metal component comprises one or more of Mo, W, Co or Ni (oxides or sulfides).

20. A method for hydrocracking hydrocarbon oil, comprising: hydrocracking hydrocarbon oil with a hydrocracking catalyst as in claim 19.

* * * * *